US012596519B2

(12) United States Patent
Takahashi et al.

(10) Patent No.: US 12,596,519 B2
(45) Date of Patent: Apr. 7, 2026

(54) AUTONOMOUS MOBILE BODY, INFORMATION PROCESSING METHOD, AND INFORMATION PROCESSING APPARATUS

(71) Applicant: SONY GROUP CORPORATION, Tokyo (JP)

(72) Inventors: Kei Takahashi, Tokyo (JP); Junichi Nagahara, Tokyo (JP); Yoshihide Fujimoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 333 days.

(21) Appl. No.: 17/755,423

(22) PCT Filed: Oct. 23, 2020

(86) PCT No.: PCT/JP2020/039845
§ 371 (c)(1),
(2) Date: Apr. 28, 2022

(87) PCT Pub. No.: WO2021/090704
PCT Pub. Date: May 14, 2021

(65) Prior Publication Data
US 2022/0413795 A1 Dec. 29, 2022

(30) Foreign Application Priority Data
Nov. 7, 2019 (JP) ................................. 2019-202083

(51) Int. Cl.
*G06F 3/16* (2006.01)
*B25J 13/08* (2006.01)
(Continued)

(52) U.S. Cl.
CPC .............. *G06F 3/165* (2013.01); *B25J 13/08* (2013.01); *B25J 19/061* (2013.01);
(Continued)

(58) Field of Classification Search
CPC . G10L 21/02; G10L 21/0208; G10L 21/0216; G10L 21/0224; G10L 21/0232;
(Continued)

(56) References Cited

U.S. PATENT DOCUMENTS 11,045,738 B1 * 6/2021 Unruh .................... A63F 13/235
2002/0059386 A1 * 5/2002 Dan ....................... H04L 67/131
709/206

(Continued)

FOREIGN PATENT DOCUMENTS

CN 109644303 A 4/2019
CN 110196632 A 9/2019
(Continued)

OTHER PUBLICATIONS

Bellona et al., Empirically informed sound synthesis application for enhancing the perception of expressive robotic movement, 2017, ICAD (Year: 2017).*

(Continued)

*Primary Examiner* — Ramya P Burgess
*Assistant Examiner* — Sara J Lewandroski
(74) *Attorney, Agent, or Firm* — CHIP LAW GROUP

(57) ABSTRACT

Provided is an autonomous mobile body, an information processing method, and an information processing apparatus capable of improving user experience by an output sound of the autonomous mobile body. The autonomous mobile body includes a recognition unit that recognizes a motion of its own device, and a sound control unit that controls an output sound output from the own device. The sound control unit controls output of a plurality of operation sounds that is the output sound corresponding to a plurality of the motions of the own device, and changes the operation sound in a case where the plurality of motions has been recognized. The present technology can be applied to, for example, a robot.

18 Claims, 19 Drawing Sheets

(51) Int. Cl.
  B25J 19/06        (2006.01)
  G10L 21/034       (2013.01)
  G10L 21/0356      (2013.01)
  G10L 21/0364      (2013.01)
(52) U.S. Cl.
  CPC ........ G10L 21/034 (2013.01); G10L 21/0356
           (2013.01); G10L 21/0364 (2013.01)
(58) Field of Classification Search
  CPC ............. G10L 21/0264; G10L 21/0272; G10L
           21/028; G10L 21/0308; G10L 21/0316;
           G10L 21/0324; G10L 21/0332; G10L
           21/034; G10L 2021/02082; G10L
           2021/02085; G10L 2021/02087; G10L
           2021/02161; G10L 2021/02163; G10L
           2021/02165; G10L 2021/02166; G10L
           2021/02168; B25J 19/061; G06F 3/16;
           G06F 3/162; G06F 3/165; G06F 3/167
  See application file for complete search history.

(56)              References Cited

U.S. PATENT DOCUMENTS

2004/0015266 A1    1/2004   Skoog
2004/0199292 A1*  10/2004   Sakagami .............. G06N 3/008
                                                  700/259
2004/0219499 A1*  11/2004   Cesa ...................... A63H 11/00
                                                  434/258
2010/0048090 A1*   2/2010   Wang ...................... A63H 3/28
                                                  446/297
2010/0261408 A1*  10/2010   Hornsby ................ A63H 11/00
                                                  446/484
2015/0206534 A1*   7/2015   Shinkai .................. G10L 15/22
                                                  704/270.1
2016/0125295 A1*   5/2016   Yun .......................... G06N 5/04
                                                  706/11

2017/0065898 A1*   3/2017   Miller .................. A63B 67/002
2018/0056519 A1    3/2018   Ogawa
2018/0152784 A1*   5/2018   Kim ......................... H04R 1/02
2018/0370039 A1   12/2018   Nakagome
2019/0184567 A1    6/2019   Hayashi
2019/0308327 A1*  10/2019   Wolford .................. B25J 9/162
2019/0361664 A1*  11/2019   Xiong ..................... G10L 15/22
2019/0389073 A1*  12/2019   Park ........................ G10L 15/22
2020/0039080 A1*   2/2020   Oyaizu ................. B25J 13/003
2021/0183359 A1*   6/2021   Hayashi ................ H04R 1/028
2021/0291379 A1*   9/2021   Hayashi ................ G10L 15/02

FOREIGN PATENT DOCUMENTS

CN        210155626  U        3/2020
DE         10196992  B4       9/2016
DE    112017004363  T5        6/2019
GB          2567600  A        4/2019
JP        2001-264466 A       9/2001
JP        2003-071762 A       3/2003
JP        2003-305677 A      10/2003
JP        2003-311019 A      11/2003
JP        2006-317556 A      11/2006
JP        2013-208681 A      10/2013
JP         2018185362 A  *  11/2018
JP        2019-162714 A       9/2019
JP        2019-166272 A      10/2019
WO       2002/045914 A1       6/2002
WO       2018/043235 A1       3/2018
WO       2019/163279 A1       8/2019

OTHER PUBLICATIONS

International Search Report and Written Opinion of PCT Application No. PCT/JP2020/039845, issued on Dec. 8, 2020, 12 pages of ISRWO.
Yumi Mizushima, "Creating New Markets! The Robot Businesses of Tomorrow", Trigger, vol. 20 No. 8, Aug. 1, 2001, pp. 28-30.

* cited by examiner

AUTONOMOUS MOBILE BODY, INFORMATION PROCESSING METHOD, AND INFORMATION PROCESSING APPARATUS

CROSS REFERENCE TO RELATED APPLICATIONS

This application is a U.S. National Phase of International Patent Application No. PCT/JP2020/039845 filed on Oct. 23, 2020, which claims priority benefit of Japanese Patent Application No. JP 2019-202083 filed in the Japan Patent Office on Nov. 7, 2019. Each of the above-referenced applications is hereby incorporated herein by reference in its entirety.

TECHNICAL FIELD

The present technology relates to an autonomous mobile body, an information processing method, a program, and an information processing apparatus, and more particularly, to an autonomous mobile body, an information processing method, a program, and an information processing apparatus that improve user experience by an output sound of the autonomous mobile body.

BACKGROUND ART

Conventionally, a robot that outputs different types of output sounds corresponding to a plurality of motions has been widely used.

Furthermore, conventionally, there has been proposed a game apparatus that determines priority of sound data at each time point during progress of a game according to priority information set on the basis of musical analysis, and opens a channel corresponding to sound data with the lowest priority in a case where there is no empty channel (see, for example, Patent Document 1).

Moreover, conventionally, there has been proposed a voice dialogue apparatus that guides user's utterance volume to a desired level by adjusting volume of music to be output (see, for example, Patent Document 2).

CITATION LIST

Patent Documents

Patent Document 1: Japanese Patent Application Laid-Open No. 2003-311019
Patent Document 2: Japanese Patent Application Laid-Open No. 2006-317556

SUMMARY OF THE INVENTION

Problems to be Solved by the Invention

Meanwhile, in a case where different types of output sounds are output corresponding to a plurality of motions of a robot, when the plurality of motions has been simultaneously detected, the output sounds corresponding to the motions are simultaneously output. Therefore, there is a case where a user cannot recognize individual output sounds and user experience is deteriorated.

The present technology has been made in view of such a situation, and aims to improve user experience by an output sound of an autonomous mobile body such as a robot and the like.

Solutions to Problems

An autonomous mobile body according to one aspect of the present technology including: a recognition unit that recognizes a motion of its own device; and a sound control unit that controls an output sound output from the own device, in which the sound control unit controls output of a plurality of operation sounds that is the output sound corresponding to a plurality of the motions of the own device, and changes the operation sound in a case where the plurality of motions has been recognized.

An information processing method according to one aspect of the present technology including: recognizing a motion of an autonomous mobile body; and controlling output of a plurality of operation sounds that is the output sound corresponding to a plurality of the motions of the autonomous mobile body, and changing the operation sound in a case where the plurality of motions has been recognized.

A program according to one aspect of the present technology causes a computer to execute processing of: recognizing a motion of an autonomous mobile body; and controlling output of a plurality of operation sounds that is the output sound corresponding to a plurality of the motions of the autonomous mobile body, and changing the operation sound in a case where the plurality of motions has been recognized.

An information processing apparatus according to one aspect of the present technology including: a recognition unit that recognizes a motion of an autonomous mobile body; and a sound control unit that controls an output sound output from the autonomous mobile body, in which the sound control unit controls output of a plurality of operation sounds that is the output sound corresponding to a plurality of the motions of the autonomous mobile body, and changes the operation sound in a case where the plurality of motions has been recognized.

According to one aspect of the present technology, a motion of an autonomous mobile body is recognized, a plurality of operation sounds that is the output sound corresponding to a plurality of the motions of the autonomous mobile body is output, and the operation sound is changed in a case where the plurality of motions has been recognized.

BRIEF DESCRIPTION OF DRAWINGS

FIG. 7 is a bottom view of the autonomous mobile body.

FIG. 14 is a block diagram showing a functional configuration example of an information processing server.

FIG. 19 is a diagram illustrating a configuration example of a computer.

MODE FOR CARRYING OUT THE INVENTION

Hereinafter, a mode for carrying out the present technology will be described. Note that the description will be given in the following order.

1. Embodiment
2. Modified Examples
3. Others

1. Embodiment

First, an embodiment of the present technology will be described with reference to FIGS. 1, 2, 3, 4A, 4B, 5, 6, 7, 8, 9, 10, 11, 12, 13, 14, 15, 16, 17, and 18.

Configuration Example of Information Processing System 1

Figure 1:
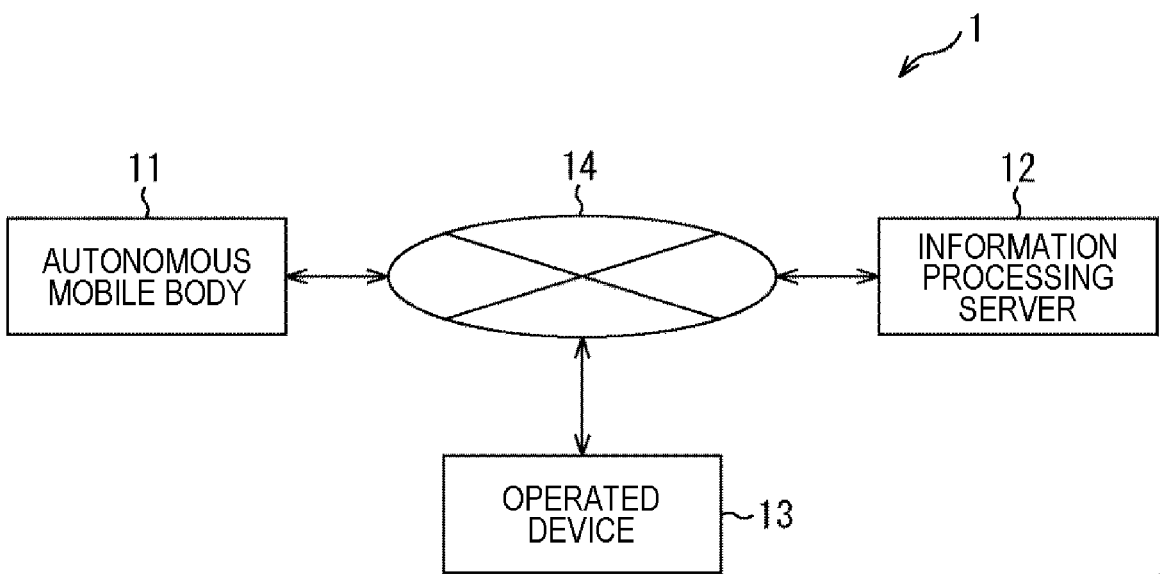
FIG. 1 is a block diagram showing an embodiment of an information processing system to which the present technology is applied.

FIG. 1 illustrates an embodiment of the information processing system 1 to which the present technology is applied.

The information processing system 1 includes an autonomous mobile body 11, an information processing server 12, and an operated device 13. The autonomous mobile body 11, the information processing server 12, and the operated device 13 are connected via a network 14.

The autonomous mobile body 11 is an information processing apparatus that performs autonomous operation not under the control of the information processing server 12 or under the control of the information processing server 12. For example, the autonomous mobile body 11 includes various robots such as a traveling type, a walking type, a flying type, and a swimming type.

Furthermore, the autonomous mobile body 11 is an agent apparatus that can realize communication with a user more naturally and effectively. One of the features of the autonomous mobile body 11 is to actively execute various operation that triggers communication with the user (hereinafter also referred to as trigger operation).

For example, the autonomous mobile body 11 can actively present information to the user on the basis of environment recognition. Furthermore, for example, the autonomous mobile body 11 actively executes various trigger operation that urges the user to perform a predetermined action.

Furthermore, the trigger operation by the autonomous mobile body 11 can be said to be active and positive interference with a physical space. The autonomous mobile body 11 can move in the physical space and execute various physical operation on a user, a living thing, an article, and the like. According to the features described above of the autonomous mobile body 11, the user can comprehensively recognize the operation of the autonomous mobile body through vision, hearing, and tactile sense, and can realize advanced communication as compared with a case of simply interacting with the user using voice.

Moreover, the autonomous mobile body 11 can express its own state or communicate with the user or another autonomous mobile body by outputting an output sound. The output sound of the autonomous mobile body 11 includes an operation sound output corresponding to a motion of the autonomous mobile body 11 and an utterance sound for communicating with a user, another autonomous mobile body, and the like. The utterance sound is not necessarily a voice representing a language that can be understood by a person, and may be a voice representing a non-language imitating animal cry and the like.

The information processing server 12 is an information processing apparatus that controls operation of the autonomous mobile body 11. For example, the information processing server 12 has a function of causing the autonomous mobile body 11 to execute various trigger operation that triggers communication with a user.

The operated device 13 is various devices operated by the autonomous mobile body 11 and the information processing server 12. The autonomous mobile body 11 can operate the various operated devices 13 not under the control of the information processing server 12 or under the control of the information processing server 12. The operated device 13 includes, for example, a home appliance such as a lighting device, a game device, a television device, and the like.

The network 14 has a function of connecting each configuration included in the information processing system 1. For example, the network 14 may include a public network such as the Internet, a telephone network, a satellite communication network, and the like, various local area networks (LANs) including Ethernet (registered trademark), a wide area network (WAN), and the like. For example, the network 14 may include a dedicated line network such as an Internet protocol-virtual private network (IP-VPN) and the like. For example, the network 14 may include a wireless communication network such as Wi-Fi (registered trademark), Bluetooth (registered trademark), and the like.

Configuration Example of Autonomous Mobile Body 11

Next, a configuration example of the autonomous mobile body 11 will be described with reference to FIGS. 2, 3, 4A, 4B, 5, 6, 7, 8, 9, 10, 11, 12, and 13. The autonomous mobile body 11 can be various devices that perform autonomous operation based on environment recognition. Hereinafter, a case where the autonomous mobile body 11 is a long-ellipsoidal agent-type robot device that autonomously travels by wheels will be described as an example. The autonomous mobile body 11 realizes various communication including information presentation, for example, by performing autonomous operation according to a user, the surroundings, and its own situation. The autonomous mobile body 11 is, for example, a small robot having such a size and weight that the user can easily lift the autonomous mobile body with one hand.

Example of Exterior of Autonomous Mobile Body 11

First, an example of an exterior of the autonomous mobile body 11 will be described with reference to FIGS. 2, 3, 4A, 4B, 5, 6, and 7.

Figure 2:
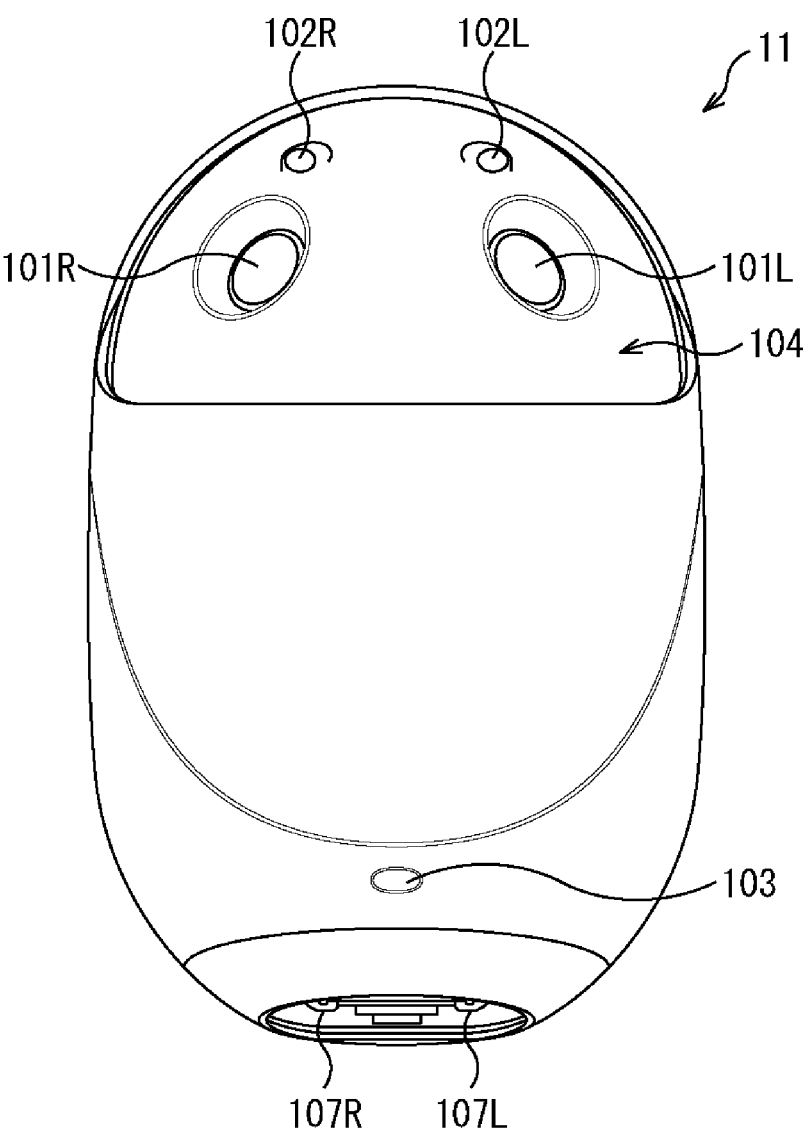
FIG. 2 is a front view of an autonomous mobile body.
Figure 3:
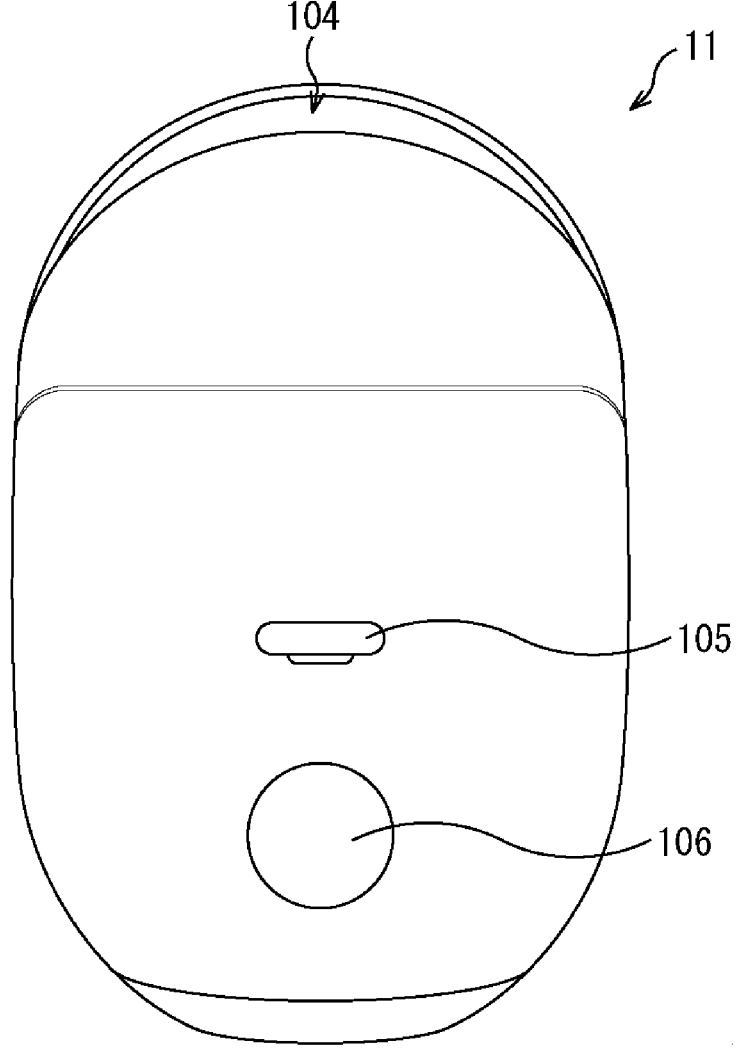
FIG. 3 is a rear view of the autonomous mobile body.
Figures 4A, 4B:
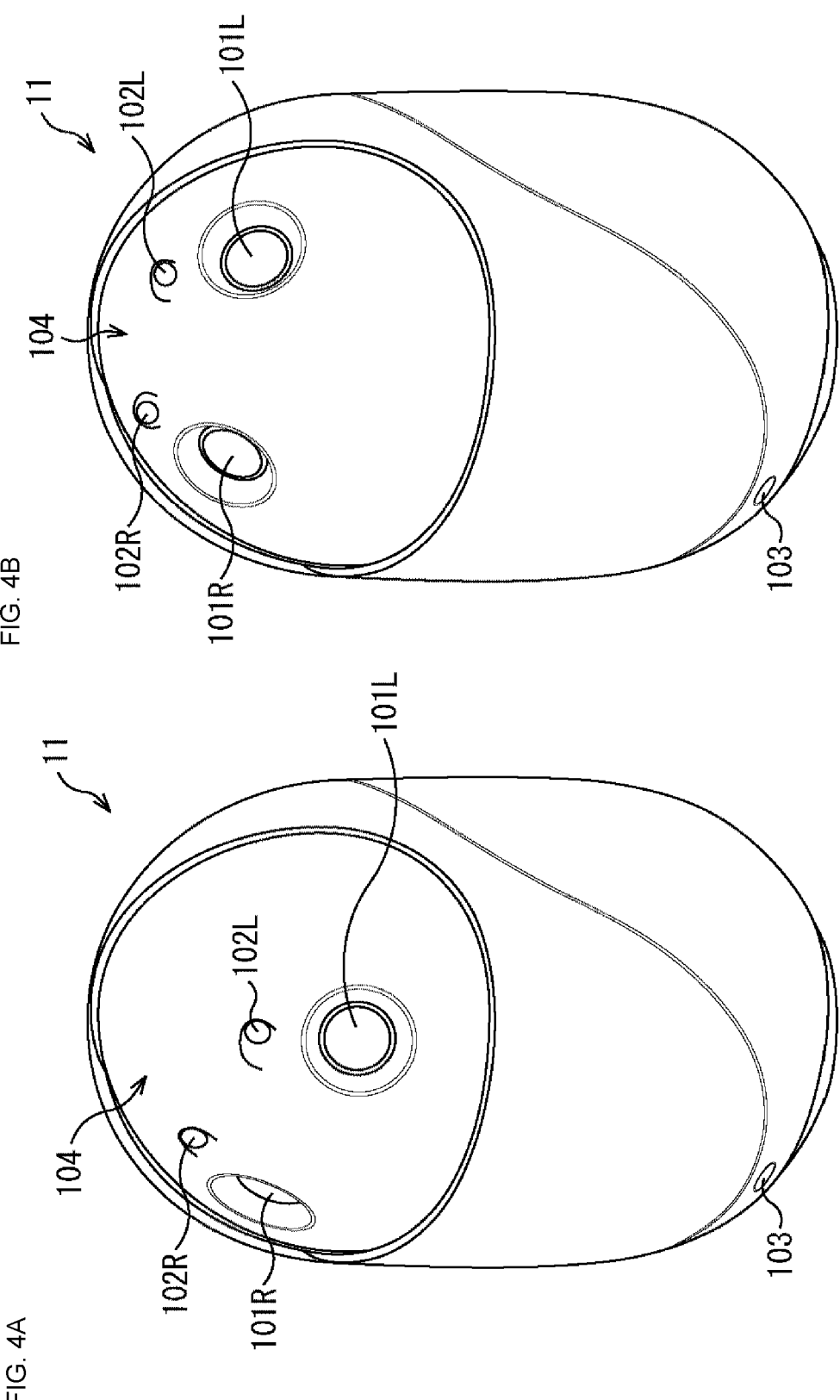
FIGS. 4A and 4B are perspective views of the autonomous mobile body.
Figure 5:
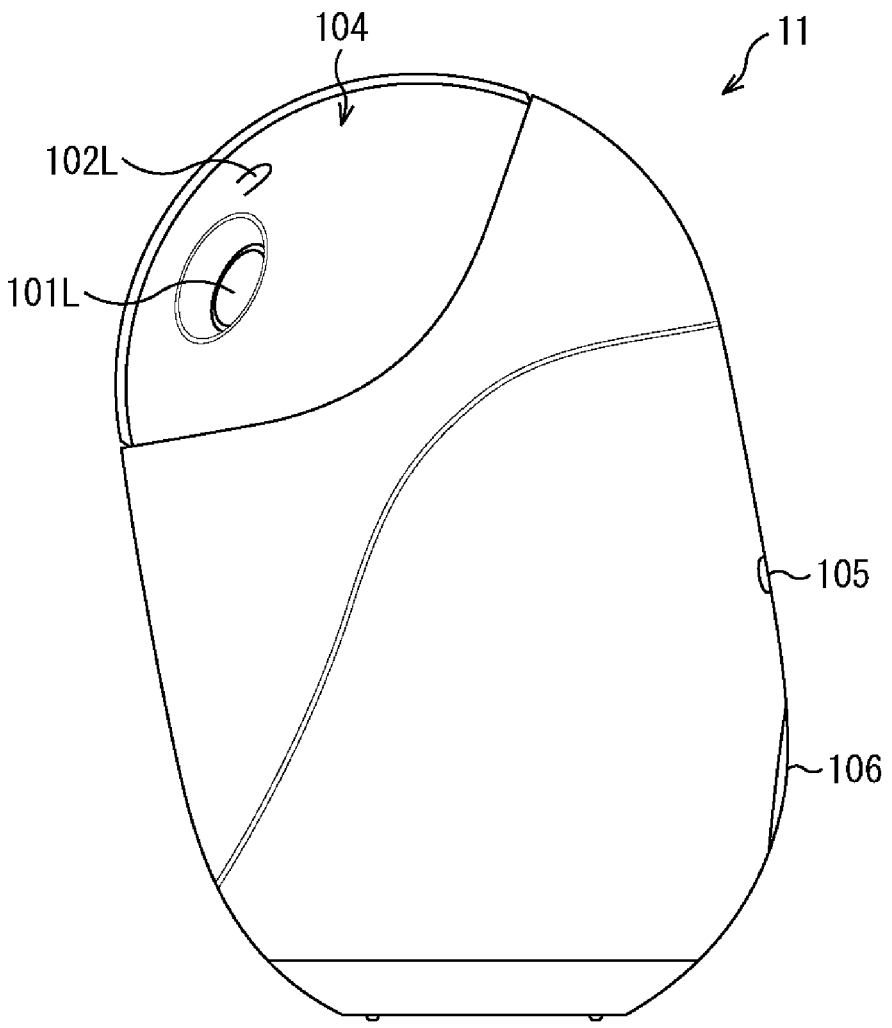
FIG. 5 is a side view of the autonomous mobile body.
Figure 6:
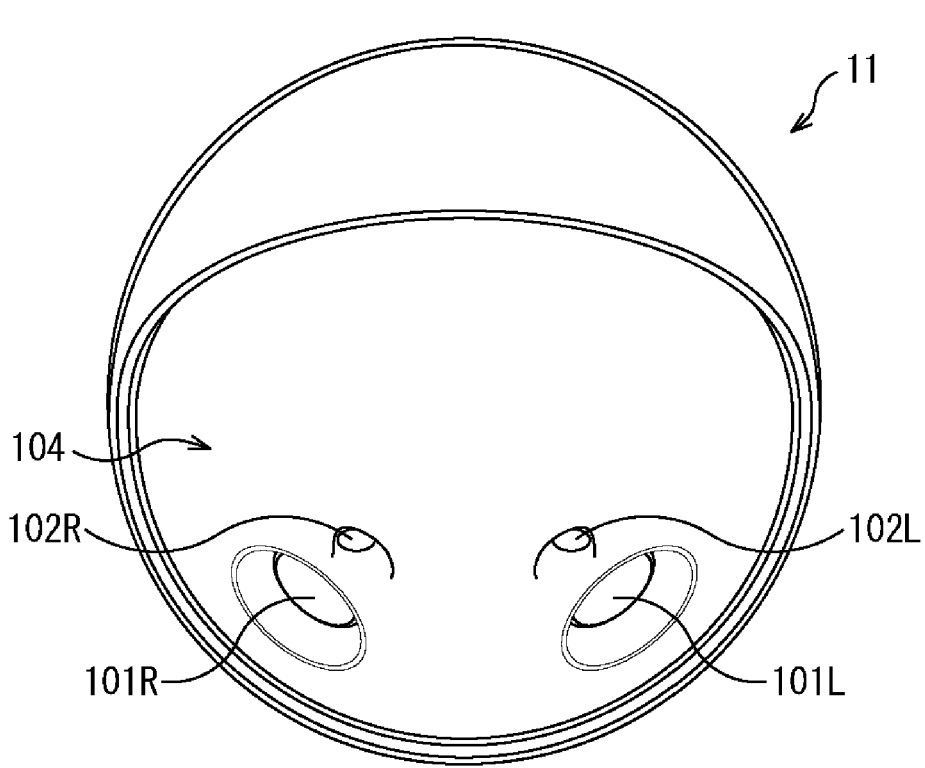
FIG. 6 is a top view of the autonomous mobile body.
Figure 7:
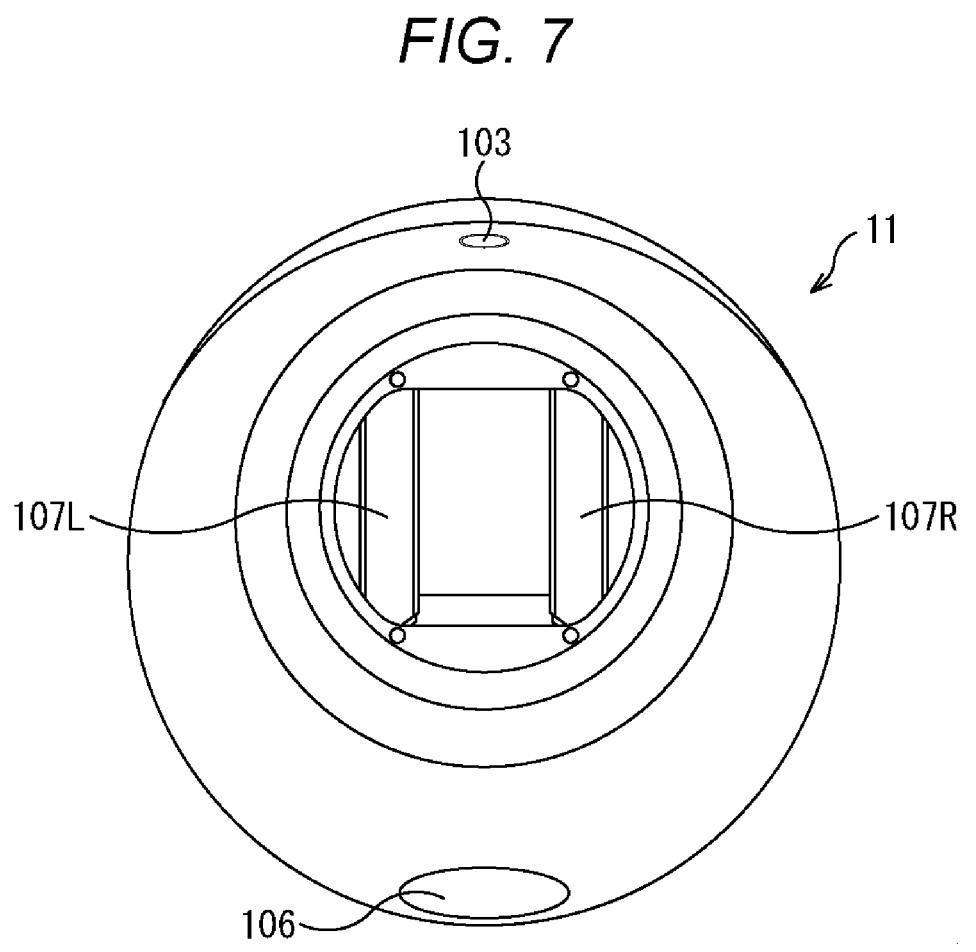

FIG. 2 is a front view of the autonomous mobile body 11, and FIG. 3 is a rear view of the autonomous mobile body 11. FIGS. 4A and 4B are perspective views of the autonomous mobile body 11. FIG. 5 is a side view of the autonomous mobile body 11. FIG. 6 is a top view of the autonomous mobile body 11. FIG. 7 is a bottom view of the autonomous mobile body 11.

As illustrated in FIGS. 2, 3, 4A, 4B, 5, and 6, the autonomous mobile body 11 includes an eye portion 101L and an eye portion 101R corresponding to a left eye and a right eye at an upper portion of a main body. The eye portion 101L and the eye portion 101R are realized by, for example, an LED or the like, and can express a line of sight, a blink, and the like. Note that the eye portion 101L and the eye portion 101R are not limited to the example described above, and may be realized by, for example, two single or independent organic light emitting diodes (OLEDs) or the like.

Furthermore, the autonomous mobile body 11 includes a camera 102L and a camera 102R above the eye portion 101L and the eye portion 101R. The camera 102L and the camera 102R have a function of imaging a user and surrounding environment. At that time, the autonomous mobile body 11 may realize simultaneous localization and mapping (SLAM) on the basis of images captured by the camera 102L and the camera 102R.

Note that the eye portion 101L, the eye portion 101R, the camera 102L, and the camera 102R are arranged on a substrate (not illustrated) arranged inside an exterior surface. Furthermore, the exterior surface of the autonomous mobile body 11 is basically formed using an opaque material, but a head cover 104 using a transparent or translucent material is provided in a portion corresponding to the substrate on which the eye portion 101L, the eye portion 101R, the camera 102L, and the camera 102R are arranged. Therefore, a user can recognize the eye portion 101L and the eye portion 101R of the autonomous mobile body 11, and the autonomous mobile body 11 can image the outside world.

Furthermore, as illustrated in FIGS. 2, 4A, 4B, and 7, the autonomous mobile body 11 includes a time of flight (ToF) sensor 103 at a front lower portion. The ToF sensor 103 has a function of detecting a distance to an object existing ahead. The autonomous mobile body 11 can detect, for example, distances to various objects with high accuracy or detect a step and the like by the ToF sensor 103 to prevent overturning or falling.

Furthermore, as illustrated in FIGS. 3, 5, and the like, the autonomous mobile body 11 includes a connection terminal 105 to an external device and a power switch 106 on a back surface. The autonomous mobile body 11 is connected to the external device via the connection terminal 105, for example, and can perform information communication.

Furthermore, as illustrated in FIG. 7, the autonomous mobile body 11 includes a wheel 107L and a wheel 107R on a bottom surface. The wheel 107L and the wheel 107R are driven by different motors (not illustrated). Therefore, the autonomous mobile body 11 can realize moving operation such as forward movement, backward movement, turning, and rotation.

Furthermore, the wheel 107L and the wheel 107R can be stored inside the main body and protruded to the outside. For example, the autonomous mobile body 11 can perform jumping operation by vigorously protruding the wheel 107L and the wheel 107R to the outside. Note that FIG. 7 illustrates a state in which the wheel 107L and the wheel 107R are stored inside the main body.

Note that, hereinafter, in a case where it is not necessary to distinguish the eye portion 101L and the eye portion 101R individually, they are simply referred to as an eye portion 101. Hereinafter, in a case where it is not necessary to individually distinguish the camera 102L and the camera 102R, they are simply referred to as a camera 102. Hereinafter, in a case where it is not necessary to distinguish the wheel 107L and the wheel 107R individually, they are simply referred to as a wheel 107.

Example of Internal Structure of Autonomous Mobile Body 11

Figure 8:
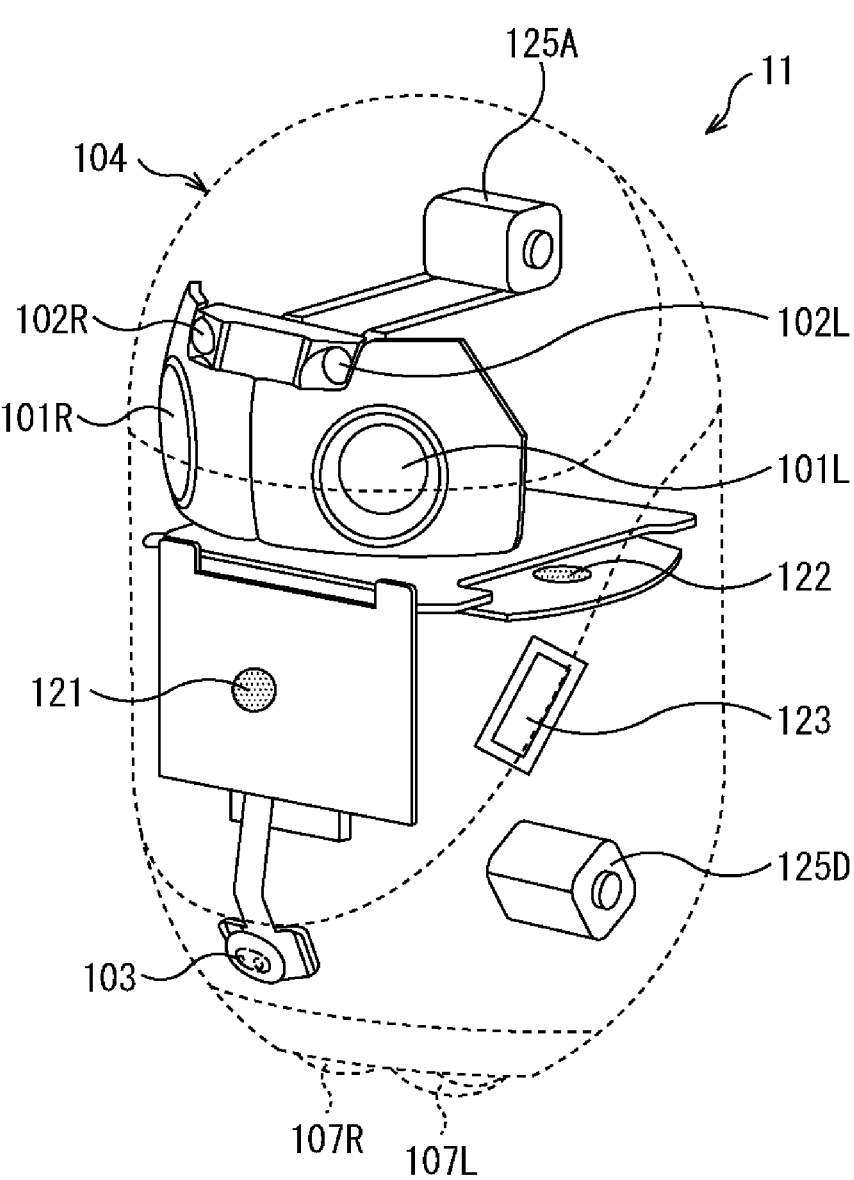
FIG. 8 is a schematic view for explaining an internal structure of the autonomous mobile body.
Figure 9:
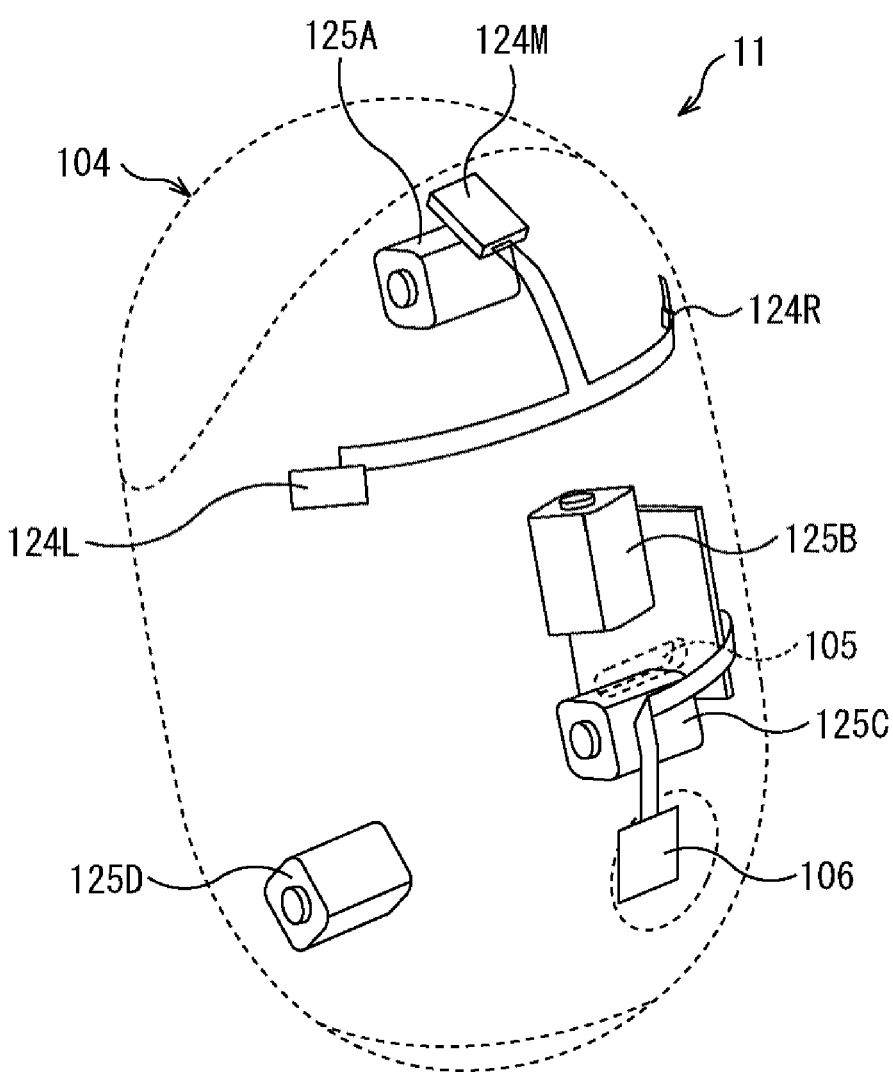
FIG. 9 is a schematic view for explaining the internal structure of the autonomous mobile body.

FIGS. 8 and 9 are schematic diagrams illustrating an internal structure of the autonomous mobile body 11.

As illustrated in FIG. 8, the autonomous mobile body 11 includes an inertial sensor 121 and a communication device 122 disposed on an electronic substrate. The inertial sensor 121 detects acceleration and angular velocity of the autonomous mobile body 11. Furthermore, the communication device 122 is a configuration for realizing wireless communication with the outside, and includes, for example, Bluetooth (registered trademark), a Wi-Fi (registered trademark) antenna, and the like.

Furthermore, the autonomous mobile body 11 includes, for example, a speaker 123 inside a side surface of the main body. The autonomous mobile body 11 can output various sounds by the speaker 123.

Furthermore, as illustrated in FIG. 9, the autonomous mobile body 11 includes a microphone 124L, a microphone 124M, and a microphone 124R inside the upper portion of the main body. The microphone 124L, the microphone 124M, and the microphone 124R collect a user's utterance and an ambient environmental sound. Furthermore, since the autonomous mobile body 11 includes the plurality of microphones 124L, microphones 124M, and microphones 124R, it is possible to collect sounds generated in the surroundings with high sensitivity and detect a position of a sound source.

Furthermore, as illustrated in FIGS. 8 and 9, the autonomous mobile body 11 includes motors 125A to 125E (whereas the motor 125E is not illustrated). The motor 125A and the motor 125B drive, for example, the substrate on which the eye portion 101 and the camera 102 are arranged in a vertical direction and a horizontal direction. The motor 125C realizes a forward tilting posture of the autonomous mobile body 11. The motor 125D drives the wheel 107L. The motor 125E drives the wheel 107R. The autonomous mobile body 11 can express rich operation by the motors 125A to 125E.

Note that, hereinafter, in a case where it is not necessary to individually distinguish the microphones 124L to 124R, they are simply referred to as a microphone 124. Hereinafter, in a case where it is not necessary to distinguish the motors 125A to 125E individually, they are simply referred to as a motor 125.

Configuration Example of Functions of Autonomous Mobile Body 11

Figure 10:
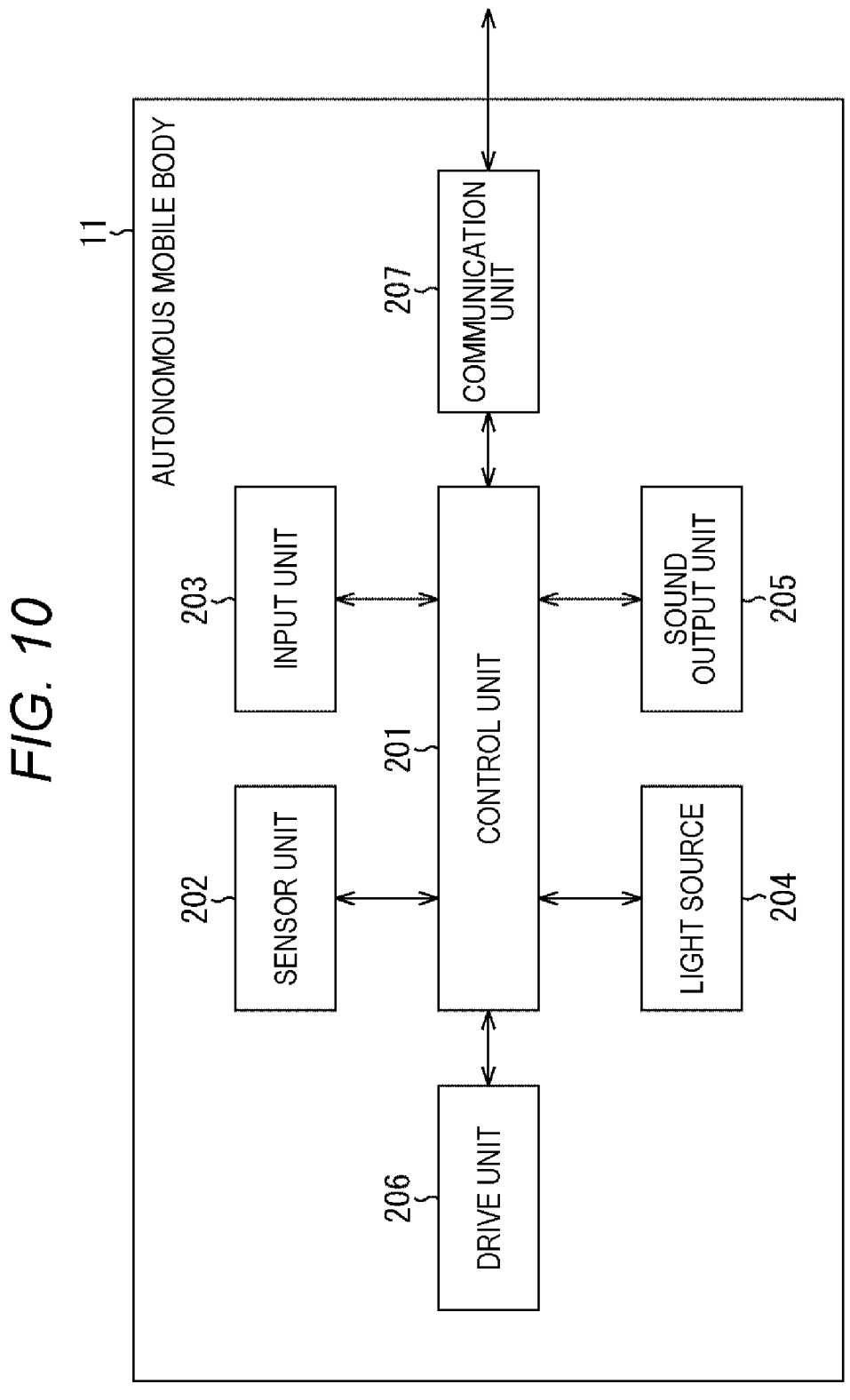
FIG. 10 is a block diagram illustrating a functional configuration example of the autonomous mobile body.

FIG. 10 illustrates a configuration example of functions of the autonomous mobile body 11. The autonomous mobile body 11 includes a control unit 201, a sensor unit 202, an input unit 203, a light source 204, a sound output unit 205, a drive unit 206, and a communication unit 207.

The control unit 201 has a function of controlling each configuration included in the autonomous mobile body 11. The control unit 201 controls, for example, activation and stop of each configuration. Furthermore, the control unit 201 supplies a control signal and the like received from the information processing server 12 to the light source 204, the sound output unit 205, and the drive unit 206.

The sensor unit 202 has a function of collecting various data regarding a user and a surrounding situation. For example, the sensor unit 202 includes the camera 102, the ToF sensor 103, the inertial sensor 121, the microphone 124, and the like described above. Furthermore, the sensor unit 202 may include, for example, various sensors such as a geomagnetic sensor, a touch sensor, various optical sensors including an infrared (IR) sensor and the like, a temperature sensor, a humidity sensor, and the like, in addition to the sensors described above. The sensor unit 202 supplies sensor data output from each sensor to the control unit 201.

The input unit 203 includes, for example, a button, a switch, and the like such as the above-described power switch 106 and the like, and detects a physical input operation by a user.

The light source 204 includes, for example, the above-described eye portion 101 and the like, and expresses eyeball operation of the autonomous mobile body 11.

The sound output unit 205 includes, for example, the above-described speaker 123, an amplifier, and the like, and outputs an output sound on the basis of output sound data supplied from the control unit 201.

The drive unit 206 includes, for example, the wheel 107, the motor 125, and the like described above, and is used for expressing body operation of the autonomous mobile body 11.

The communication unit 207 includes, for example, the connection terminal 105, the communication device 122, and the like described above, and communicates with the information processing server 12, the operated device 13, and the other external device. For example, the communication unit 207 transmits the sensor data supplied from the sensor unit 202 to the information processing server 12, and receives, from the information processing server 12, the control signal for controlling operation of the autonomous mobile body 11 and the output sound data for outputting the output sound from the autonomous mobile body 11.

Configuration Example of Information Processing Unit 241

Figure 11:
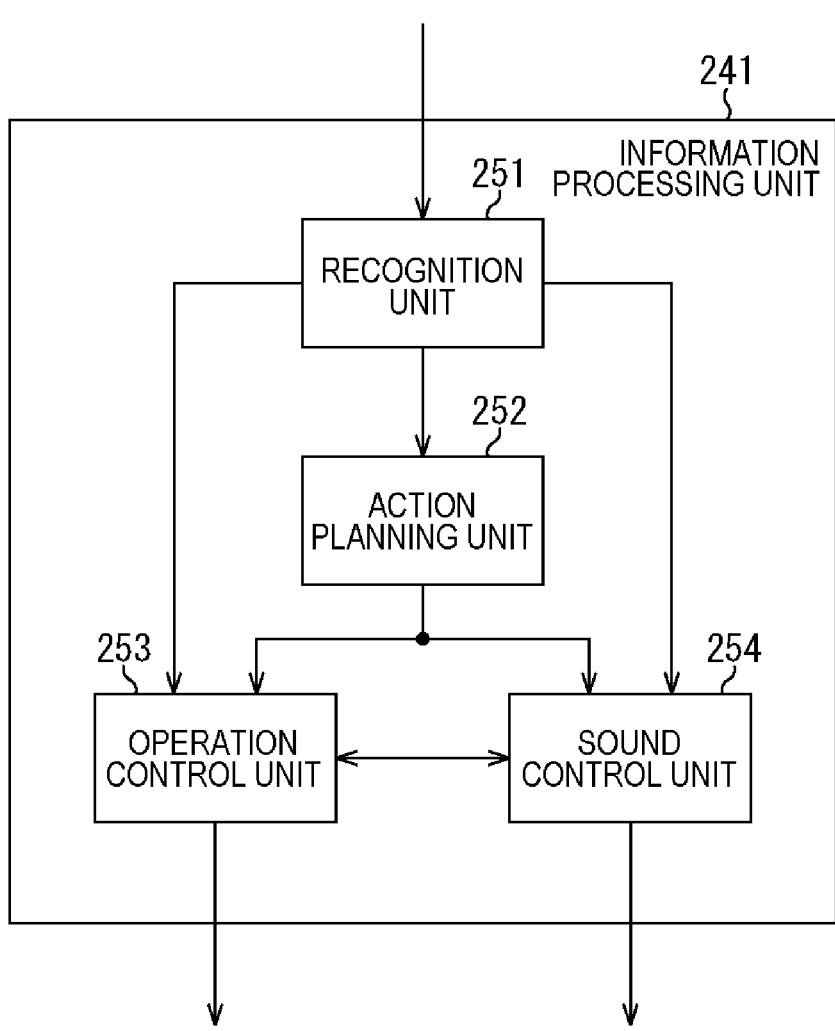
FIG. 11 is a block diagram illustrating a functional configuration example realized by a control unit of the autonomous mobile body.

FIG. 11 illustrates a configuration example of an information processing unit 241 realized by the control unit 201 of the autonomous mobile body 11 executing a predetermined control program.

The information processing unit 241 includes a recognition unit 251, an action planning unit 252, an operation control unit 253, and a sound control unit 254.

The recognition unit 251 has a function of recognizing a user and environment around the autonomous mobile body 11 and various information regarding the autonomous mobile body 11 on the basis of the sensor data supplied from the sensor unit 202.

For example, the recognition unit 251 performs user identification, recognition of user's expression or line of sight, object recognition, color recognition, shape recognition, marker recognition, obstacle recognition, step recognition, brightness recognition, and the like. For example, the recognition unit 251 performs emotion recognition related to user's voice, word understanding, recognition of a position of a sound source, and the like. For example, the recognition unit 251 recognizes ambient temperature, presence of an animal body, posture and motion of the autonomous mobile body 11, and the like.

Furthermore, the recognition unit 251 has a function of estimating and understanding an environment and a situation in which the autonomous mobile body 11 is placed on the basis of the recognized information. At this time, the recognition unit 251 may comprehensively perform situation estimation using environmental knowledge stored in advance.

The recognition unit 251 supplies data indicating a recognition result to the action planning unit 252, the operation control unit 253, and the sound control unit 254.

The action planning unit 252 has a function of planning an action performed by the autonomous mobile body 11 on the basis of the recognition result by the recognition unit 251 and learning knowledge. The action planning unit 252 executes an action plan using, for example, a machine learning algorithm such as deep learning and the like. The action planning unit 252 supplies information indicating the action plan to the operation control unit 253 and the sound control unit 254.

The operation control unit 253 performs operation control of the autonomous mobile body 11 by controlling the light source 204 and the drive unit 206 on the basis of the recognition result by the recognition unit 251 and the action plan by the action planning unit 252. For example, the operation control unit 253 moves the autonomous mobile body 11 in a forward tilting posture, or performs a back-and-forth motion, a turning motion, a rotary motion, and the like. Furthermore, the operation control unit 253 causes the autonomous mobile body 11 to actively execute trigger operation that triggers communication between a user and the autonomous mobile body 11. Furthermore, the operation control unit 253 supplies information regarding the operation performed by the autonomous mobile body 11 to the sound control unit 254.

The sound control unit 254 performs output control of an output sound by controlling the sound output unit 205 on the basis of the recognition result by the recognition unit 251 and the action plan by the action planning unit 252. For example, the sound control unit 254 determines an output sound to be output from the autonomous mobile body 11 on the basis of the recognition result by the recognition unit 251 and the action plan by the action planning unit 252. Furthermore, the sound control unit 254 generates output sound data for outputting the determined output sound, and supplies the data to the sound output unit 205. Furthermore, the sound control unit 254 supplies information regarding the output sound output from the autonomous mobile body 11 to the operation control unit 253.

<Method for Generating Synthesis Sound>

Next, a method for generating a synthesis sound in the sound control unit 254 will be described.

The sound control unit 254 generates an output sound including a synthesis sound using, for example, an FM sound source. At this time, the sound control unit 254 can variously express an impression and emotional connotation of the synthesis sound by dynamically and continuously changing various parameters related to synthesis of the FM sound source.

Figure 12:
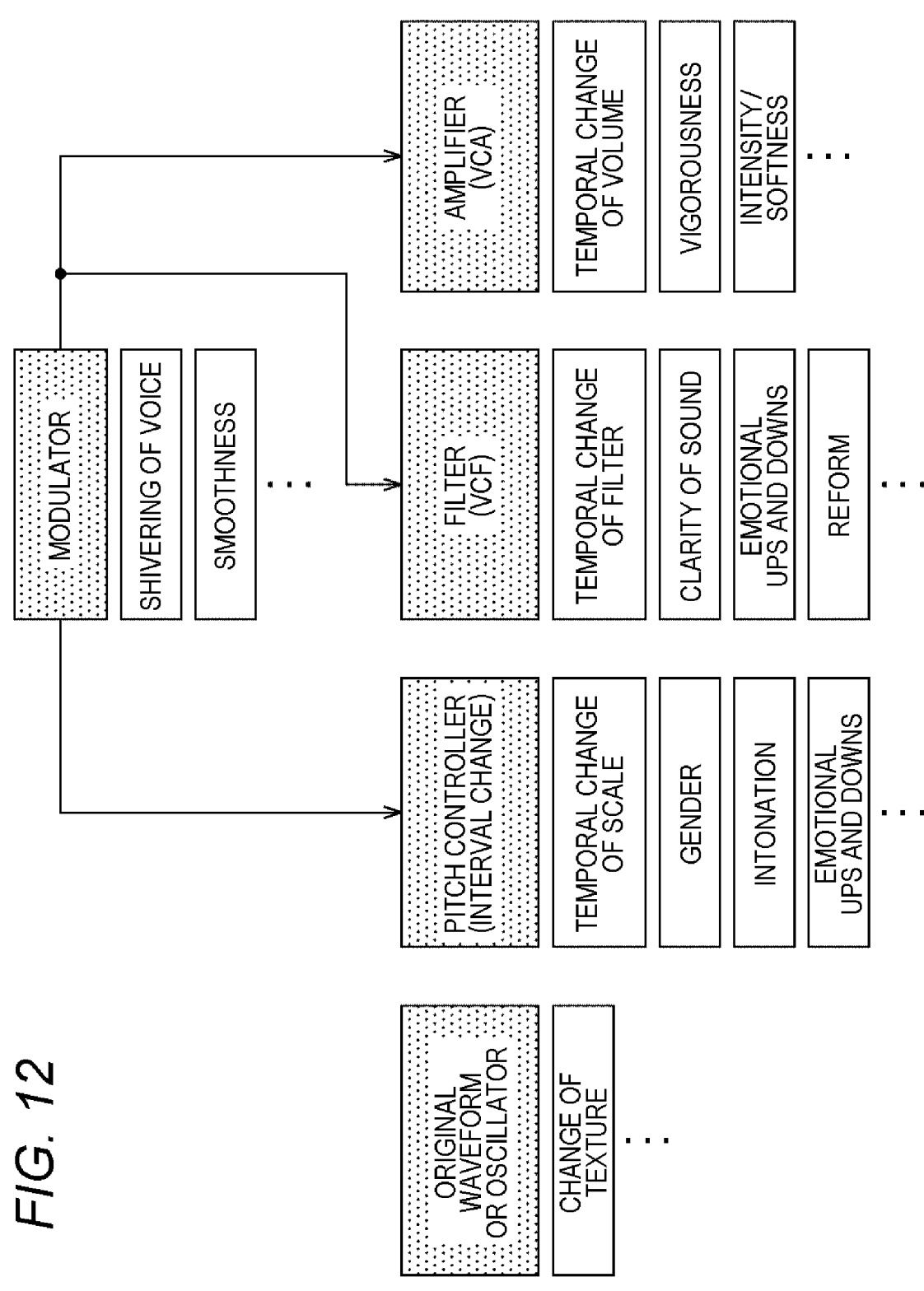
FIG. 12 is a diagram for explaining parameters related to a synthesis sound.

FIG. 12 is a diagram for explaining parameters related to the synthesis sound. FIG. 12 illustrates a relationship between a configuration included in a synthesizer that synthesizes the FM sound source and an output mode expressed by the synthesis sound by a change in a parameter related to each configuration.

For example, the sound control unit 254 can change a basic texture of sound by changing a parameter related to an oscillator. As an example, the sound control unit 254 can express a soft impression by using a sine wave as a waveform of the sound, and can express a sharp impression by using a sawtooth shape.

Furthermore, the sound control unit 254 can express a difference in gender, intonation, emotional ups and downs, and the like, for example, by controlling parameters of a pitch controller, that is, pitch.

Figure 13:
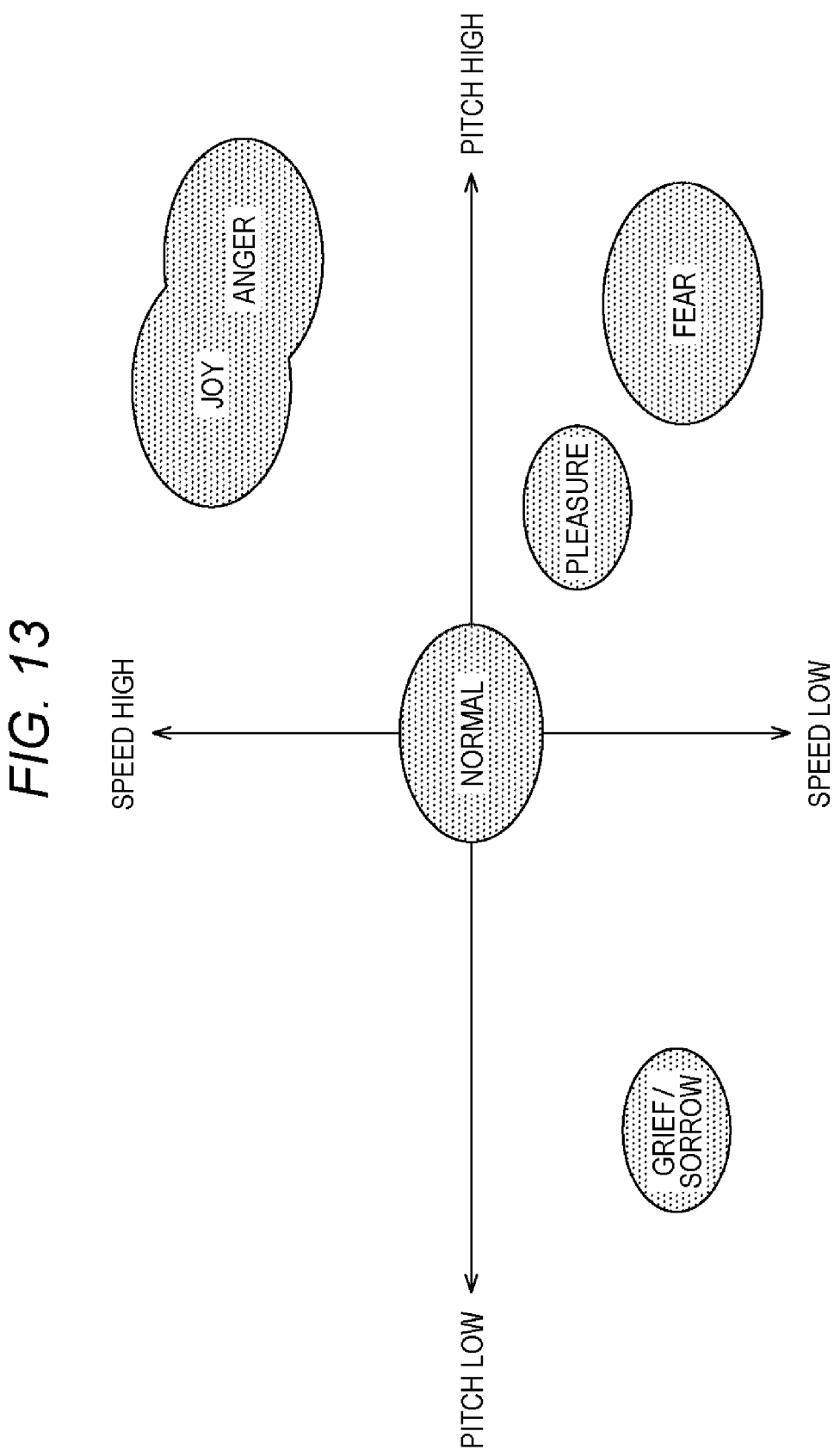
FIG. 13 is a diagram illustrating an example of emotions that can be expressed by controlling pitch and speed.

FIG. 13 is a diagram illustrating an example of emotions that can be expressed by controlling pitch and speed of sound. Note that a size (an area) of a hatched region in FIG. 13 indicates volume. It is known that pitch and speed of sound strongly affect recall of an emotion expressed by the sound. The sound control unit 254 can express a degree of joy, anger, and the like by setting the pitch and the speed to be relatively high, for example. Conversely, the sound control unit 254 can express sorrow by setting the pitch and the speed to be relatively low. As described above, the sound control unit 254 can express various emotions and degrees thereof by controlling the pitch and the speed of the sound.

Returning to FIG. 12, the sound control unit 254 can express clarity of sound (a way of opening a mouth) by controlling parameters of a filter. For example, the sound control unit 254 can express muffled sound or opened sound by increasing or decreasing frequency of a high cut filter.

Furthermore, the sound control unit 254 can change an accent of voice volume and an impression of a way of rising or ending by a temporal change of an amplifier.

Furthermore, the sound control unit 254 can express shivering of voice and smoothness by controlling parameters of a modulator.

As described above, the sound control unit 254 can express various impressions and emotional connotations by changing each parameter related to the oscillator, the modulator, the pitch controller, the filter, the amplifier, or the like.

Functional Configuration Example of Information Processing Server 12

Figure 14:
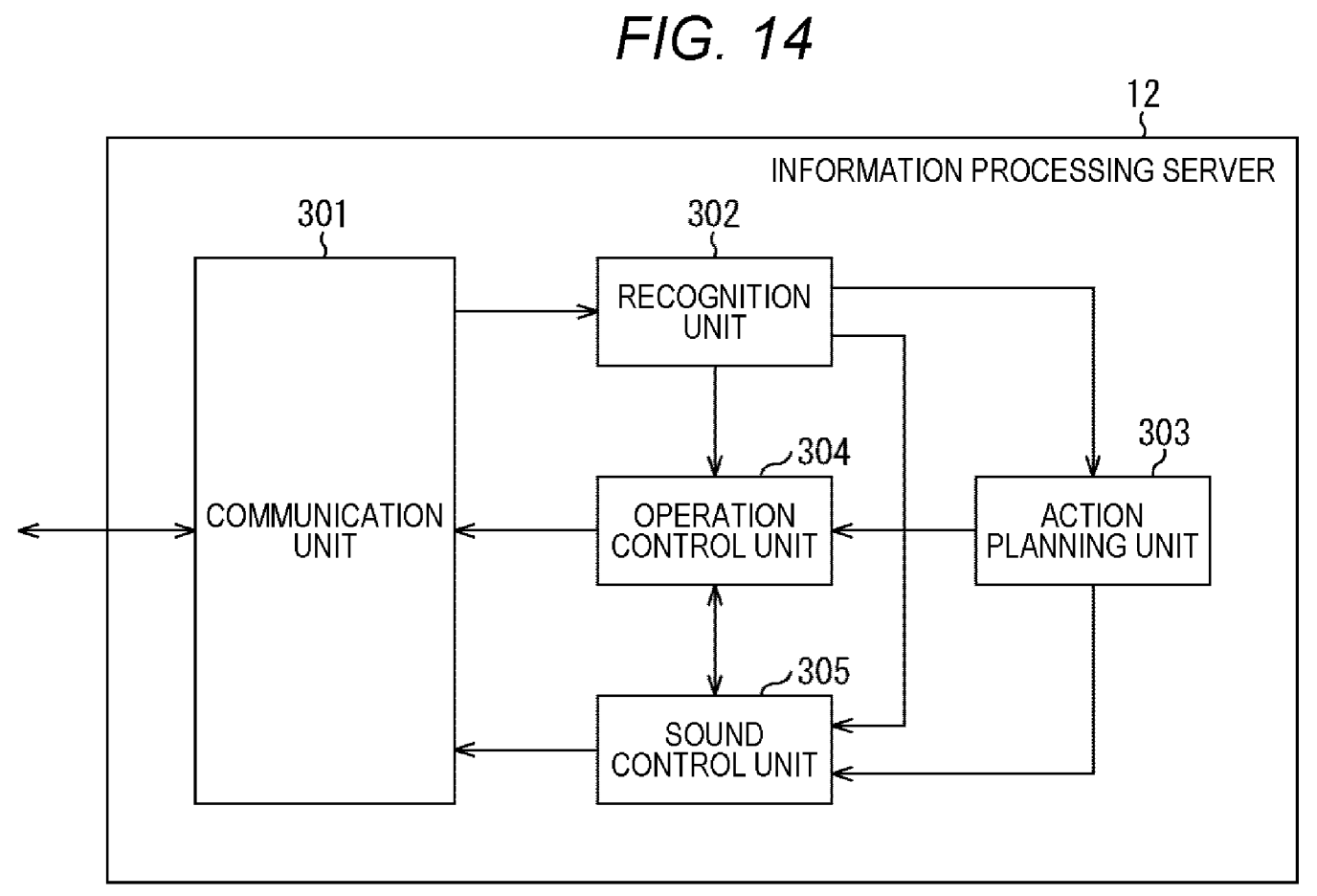

FIG. 14 illustrates a functional configuration example of the information processing server 12.

The information processing server 12 includes a communication unit 301, a recognition unit 302, an action planning unit 303, an operation control unit 304, and a sound control unit 305.

The communication unit 301 communicates with the autonomous mobile body 11 and the operated device 13 via the network 14. For example, the communication unit 301 receives sensor data from the autonomous mobile body 11, and transmits, to the autonomous mobile body 11, a control signal for controlling operation of the autonomous mobile body 11 and output sound data for outputting an output sound from the autonomous mobile body 11.

The recognition unit 302, the action planning unit 303, the operation control unit 304, and the sound control unit 305 have functions similar to those of the recognition unit 251, the action planning unit 252, the operation control unit 253, and the sound control unit 254 of the autonomous mobile body 11. That is, the recognition unit 302, the action planning unit 303, the operation control unit 304, and the sound control unit 305 can perform various types of processing instead of the recognition unit 251, the action planning unit 252, the operation control unit 253, and the sound control unit 254 of the autonomous mobile body 11.

Therefore, the information processing server 12 can remotely control the autonomous mobile body 11, and the autonomous mobile body 11 can perform various operation and output various output sounds under the control of the information processing server 12.

<Processing of Autonomous Mobile Body 11>

Next, processing of the autonomous mobile body 11 will be described with reference to FIGS. 15 to 18.

Note that, hereinafter, an example of a case where the autonomous mobile body 11 independently performs various operation or outputs various output sounds without being controlled by the information processing server 12 will be described.

Basic Example of Operation Sound Output Control Processing

Figure 15:
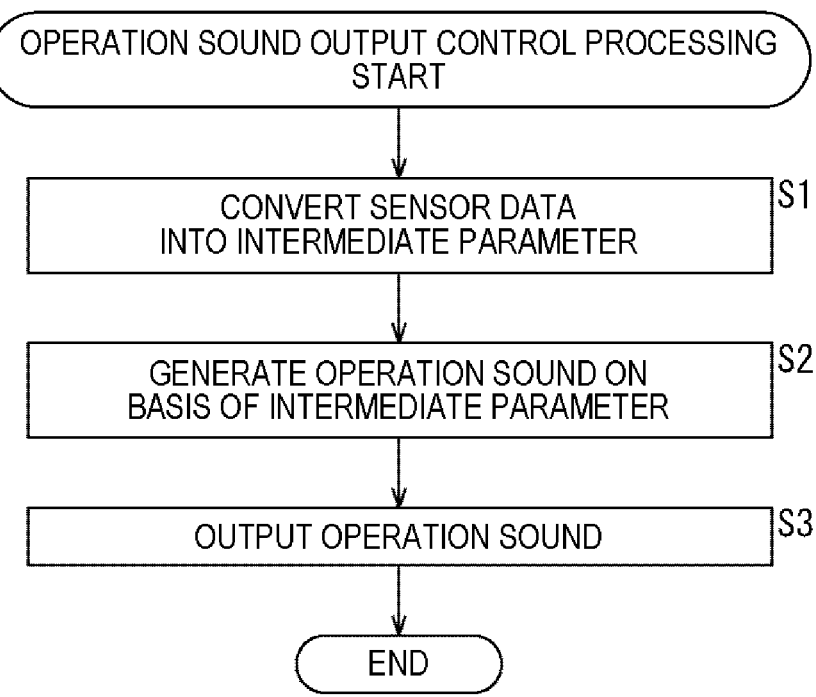
FIG. 15 is a flowchart for explaining a basic example of operation sound output control processing executed by the autonomous mobile body.

First, a basic example of operation sound output control processing executed by the autonomous mobile body 11 will be described with reference to a flowchart of FIG. 15.

In step S1, the recognition unit 251 converts sensor data into an intermediate parameter.

For example, sensor data of an acceleration sensor included in the inertial sensor 121 includes a gravitational acceleration component. Therefore, in a case where an operation sound is output using the sensor data of the acceleration sensor as it is, the operation sound is always output even if the autonomous mobile body 11 is not moving.

Furthermore, since the sensor data of the acceleration sensor includes acceleration in three axial directions of an x-axis, a y-axis, and a z-axis, components corresponding to vibration and noise are also included in addition to a component corresponding to movement of the autonomous mobile body 11. Therefore, in a case where the operation sound is output using the sensor data of the acceleration sensor as it is, the operation sound is output in response to the vibration and the noise in addition to the movement of the autonomous mobile body 11.

On the other hand, the recognition unit 251 converts the sensor data of each sensor included in the sensor unit 202 into an intermediate parameter that corresponds to a motion of the autonomous mobile body 11 to be a target for outputting the operation sound and can be understood by a person.

Specifically, the recognition unit 251 acquires the sensor data from each sensor included in the sensor unit 202, and performs arithmetic and logical operations such as filter processing, threshold processing, and the like on each sensor data, thereby converting each sensor data into a predetermined type of intermediate parameter.

Figure 16:
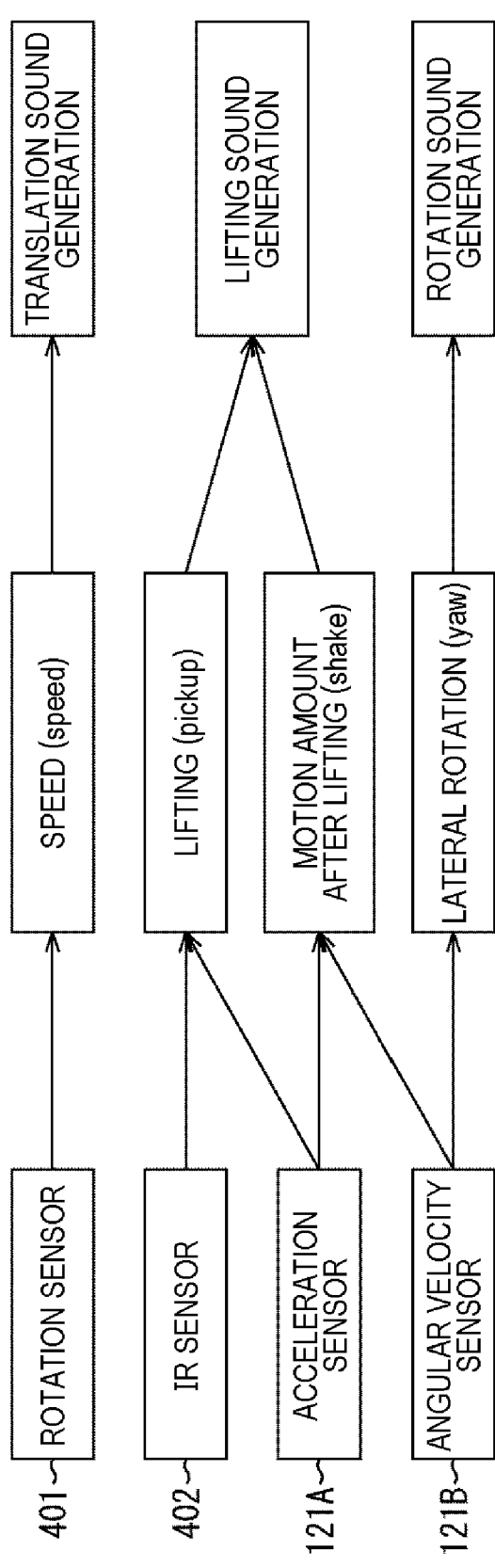
FIG. 16 is a diagram illustrating a specific example of a method of generating an operation sound from sensor data.

FIG. 16 illustrates a specific example of a method of converting the sensor data into the intermediate parameter.

For example, the recognition unit 251 acquires sensor data indicating rotation speed of the motor 125D or the motor 125E of the autonomous mobile body 11 from a rotation sensor 401 included in the sensor unit 202. The recognition unit 251 calculates a movement amount of the autonomous mobile body 11 by calculating odometry on the basis of the rotation speed of the motor 125D or the motor 125E. Furthermore, the recognition unit 251 calculates speed of the autonomous mobile body 11 in translation directions (front, rear, left, and right directions) on the basis of the movement amount of the autonomous mobile body 11. Therefore, the sensor data is converted into the speed that is the intermediate parameter.

For example, the recognition unit 251 acquires, from an IR sensor 402 (not illustrated in FIGS. 2, 3, 4A, 4B, 5, 6, 7, 8, and 9) included in the sensor unit 202 and provided on the bottom surface of the autonomous mobile body 11, sensor data indicating whether or not an object (for example, a floor surface) approaches the bottom surface. Furthermore, the recognition unit 251 acquires sensor data indicating acceleration of the autonomous mobile body 11 from an acceleration sensor 121A included in the inertial sensor 121. The recognition unit 251 detects whether or not the autonomous mobile body 11 is lifted on the basis of whether or not the object approaches the bottom surface of the autonomous mobile body 11 and the acceleration of the autonomous mobile body 11. Therefore, the sensor data is converted into the presence or absence of lifting that is the intermediate parameter.

For example, the recognition unit 251 acquires the sensor data indicating the acceleration of the autonomous mobile body 11 from the acceleration sensor 121A. Furthermore, the recognition unit 251 acquires sensor data indicating angular velocity of the autonomous mobile body 11 from an angular velocity sensor 121B included in the inertial sensor 121. The recognition unit 251 detects a motion amount after the autonomous mobile body 11 is lifted on the basis of the acceleration and the angular velocity of the autonomous mobile body 11. This motion amount indicates, for example, an amount by which the autonomous mobile body 11 is shaken after being lifted. Therefore, the sensor data is converted into the motion amount after the autonomous mobile body 11 is lifted, which is the intermediate parameter.

For example, the recognition unit 251 acquires the sensor data indicating the angular velocity of the autonomous mobile body 11 from the angular velocity sensor 121B. The recognition unit 251 detects rotation in a yaw direction (lateral rotation) about an axis in a vertical direction of the autonomous mobile body on the basis of the angular velocity of the autonomous mobile body 11. Therefore, the autonomous mobile body 11 whose sensor data is the intermediate parameter is converted into the lateral rotation.

In step S2, the sound control unit 254 generates an operation sound on the basis of the intermediate parameter.

For example, in a case where the speed of the autonomous mobile body 11 is a predetermined threshold value or more, the sound control unit 254 generates a translation sound which is an operation sound corresponding to the translation of the autonomous mobile body 11. At this time, for example, the sound control unit 254 changes some of the parameters such as frequency, volume, a degree of modulation, and the like of the translation sound on the basis of an amount of change in the speed of the autonomous mobile body 11.

For example, in a case where the autonomous mobile body 11 is lifted, the sound control unit 254 generates a lifting sound which is an operation sound corresponding to the lifting of the autonomous mobile body 11. At this time, for example, the sound control unit 254 changes some of the parameters such as frequency, volume, a degree of modulation, and the like of the lifting sound on the basis of a change in the motion amount after the autonomous mobile body 11 is lifted.

For example, in a case where rotation speed of the autonomous mobile body 11 in the lateral rotation is equal to or more than a predetermined threshold, the sound control unit 254 generates a rotation sound which is an operation sound corresponding to the lateral rotation of the autonomous mobile body 11. At this time, for example, the sound control unit 254 changes some of the parameters such as frequency, volume, a degree of modulation, and the like of the rotation sound on the basis of a change in the rotation speed of the autonomous mobile body 11 in the lateral direction.

In step S3, the autonomous mobile body 11 outputs an operation sound. Specifically, the sound control unit 254 generates output sound data for outputting the generated operation sound, and supplies the data to the sound output unit 205. The sound output unit 205 outputs the operation sound on the basis of the acquired output sound data.

As described above, the operation sound is output in accordance with the motion of the autonomous mobile body 11.

Modified Example of Operation Sound Output Control Processing

As described above, in a case where the autonomous mobile body 11 outputs different operation sounds for a plurality of motions, when the plurality of motions has been simultaneously recognized, the plurality of operation sounds is simultaneously output. In this case, since the plurality of operation sounds is simultaneously output, a user cannot recognize individual operation sounds, and there is a possibility that user experience is deteriorated.

Furthermore, for example, there is a case where a motion of the autonomous mobile body 11 recognized by the user is different from a motion of the autonomous mobile body 11 recognized by the recognition unit 251 of the autonomous mobile body 11.

For example, even if the autonomous mobile body 11 appears to be moving straight from the user, there is a case where the recognition unit 251 of the autonomous mobile body 11 detects lateral rotation of the autonomous mobile body 11 on the basis of the sensor data of the angular velocity sensor 121B. In this case, if a rotation sound is output from the autonomous mobile body 11, there is a possibility that the user feels uncomfortable.

Furthermore, for example, in a case where the user lifts and shakes the autonomous mobile body 11, the recognition unit 251 of the autonomous mobile body 11 sometimes detects lateral rotation of the autonomous mobile body 11 on the basis of the sensor data of the angular velocity sensor 121B. In this case, if a rotation sound is output from the autonomous mobile body 11, there is a possibility that the user feels uncomfortable.

On the other hand, the autonomous mobile body 11 controls output of the operation sound on the basis of priority as follows, thereby outputting a natural operation sound without giving a sense of discomfort to the user.

Here, a modified example of the operation sound output control processing executed by the autonomous mobile body 11 will be described with reference to a flowchart of FIG. 17.

For example, this processing is started when power of the autonomous mobile body 11 is turned on and is ended when the power is turned off.

In step S51, the recognition unit 251 determines whether or not a motion of the autonomous mobile body 11 has been recognized. This determination processing is repeatedly executed until it is determined that the recognition unit 251 has recognized the motion of the autonomous mobile body 11 to be a target for outputting an operation sound on the basis of sensor data from the sensor unit 202. Then, in a case where it is determined that the motion of the autonomous mobile body 11 to be the target for outputting the operation sound has been recognized, the processing proceeds to step S52.

In step S52, the recognition unit 251 recognizes a surrounding situation on the basis of the sensor data from the sensor unit 202.

For example, the recognition unit 251 recognizes presence or absence of a user around the autonomous mobile body 11, identification of the user, a state of the user, and the like. At this time, for example, a target user may be limited to a specific person such as an owner of the autonomous mobile body 11 and the like, or not limited to a specific person, and all the people around the autonomous mobile body 11 may be regarded as the users.

Furthermore, for example, the recognition unit 251 recognizes presence or absence, a type, a position, a distance, a feature, a state, and the like of an object around the autonomous mobile body 11. The object around the autonomous mobile body 11 includes, for example, another autonomous mobile body.

Note that the distance between the autonomous mobile body 11 and the surrounding object is detected on the basis of, for example, sensor data from at least one of the camera 102 or the ToF sensor 103.

Alternatively, for example, the communication unit 207 of the autonomous mobile body 11 may detect the distance to the surrounding object by performing short-range wireless communication with the surrounding object.

Alternatively, for example, the communication unit 207 of the autonomous mobile body 11 may receive information indicating a current position of the surrounding object from the information processing server 12 and the like, and the recognition unit 251 may detect the distance to the surrounding object on the basis of a current position of the autonomous mobile body 11 and the current position of the surrounding object.

Moreover, for example, the recognition unit 251 recognizes volume, a feature, a content, a position of a sound source, and the like of a sound around the autonomous mobile body 11 on the basis of sensor data from the microphone 124.

The recognition unit 251 supplies information indicating a recognition result of the motion of the autonomous mobile body 11 and the surrounding situation to the sound control unit 254.

In step S53, the sound control unit 254 determines whether or not the surroundings are noisy. For example, in a case where a level of a recognized surrounding sound is a predetermined threshold or more, the sound control unit 254 determines that the surroundings are noisy. The processing returns to step S51, and the processing in step S51 and subsequent steps is executed.

That is, in a case where the surroundings are noisy, the operation sound is difficult to hear and there is a possibility that it disturbs the surrounding sound, so that the operation sound is not output.

On the other hand, in step S53, in a case where the level of the recognized surrounding sound is less than the predetermined threshold, the sound control unit 254 determines that the surroundings are not noisy, and the processing proceeds to step S54.

In step S54, the sound control unit 254 determines whether or not a user's utterance has been recognized. In a case where it is determined that the user's utterance has not been recognized, the processing proceeds to step S55.

In step S55, the sound control unit 254 determines whether or not a user's face has been detected. In a case where it is determined that the user's face has not been detected, the processing proceeds to step S55.

In step S56, the sound control unit 254 determines whether or not a trigger for a start of a user's utterance has been recognized. As the trigger for the start of the user's utterance, for example, a gesture by which a user tries to talk to the autonomous mobile body 11, an operation in which the user pushes the autonomous mobile body 11 or touches the autonomous mobile body 11, and the like are assumed. In a case where it is determined that the trigger for the start of the user's utterance has been recognized, the processing proceeds to step S57.

On the other hand, in a case where it is determined in step S55 that the user's face has been detected, the processing in step S56 is skipped, and the processing proceeds to step S57.

Furthermore, in a case where it is determined in step S54 that the user's utterance has been recognized, the processing in steps S55 and S56 is skipped, and the processing proceeds to step S57.

In other words, in a case where the user talks to or tries to talk to the autonomous mobile body 11, the processing proceeds to step S57.

In step S57, the sound control unit 254 determines whether or not an operation sound having a higher priority than the user's utterance is an output target.

For example, in the autonomous mobile body 11, priority is set in advance for each output sound such as an operation sound and the like. For example, with respect to the output sound of the autonomous mobile body 11, priority is set such that lifting sound>utterance sound (of the autonomous mobile body 11)>translation sound>rotation sound. Note that an output sound on a left side of an inequality sign has a higher priority than an output sound on a right side. Then, an output sound having a higher priority is preferentially output.

Furthermore, for example, with respect to the user's utterance, priority of each output sound is set such that lifting sound>user's utterance>utterance sound (of the autonomous mobile body 11)>translation sound>rotation sound. In other words, the lifting sound has a higher priority than the user's utterance, and the utterance sound, the translation sound, and the rotation sound have a lower priority than the user's utterance.

Therefore, in a case of the priority described above, in a case where lifting of the autonomous mobile body 11 is not recognized, the sound control unit 254 determines that the operation sound (lifting sound) having the higher priority than the user's utterance is not the output target. The processing returns to step S51, and the processing in step S51 and subsequent steps is executed. That is, in this case, the user's utterance is prioritized, and the operation sound is not output.

On the other hand, in step S57, for example, in a case where lifting of the autonomous mobile body 11 is detected, the sound control unit 254 determines that the operation sound having the higher priority than the user's utterance is the output target, and the processing proceeds to step S58.

Furthermore, in a case where it is determined in step S56 that the trigger for the start of the user's utterance has not been recognized, the processing in step S57 is skipped, and the processing proceeds to step S58. That is, in a case where the user does not talk to or does not try to talk to the autonomous mobile body 11, the processing of step S57 is skipped, and the processing proceeds to step S58.

In step S58, the sound control unit 254 determines whether or not the autonomous mobile body 11 is uttering. In a case where the autonomous mobile body 11 is outputting an utterance sound, the sound control unit 254 determines that the autonomous mobile body 11 is uttering, and the processing proceeds to step S59.

In step S59, the sound control unit 254 determines whether or not an operation sound having a higher priority than the utterance of the autonomous mobile body 11 is an output target. For example, in a case where the above-described priority is set, in a case where lifting of the autonomous mobile body 11 is not detected, the sound control unit 254 determines that the operation sound (lifting sound) having the higher priority than the utterance of the autonomous mobile body 11 is not the output target. The processing returns to step S51, and the processing in and after step S51 is executed. That is, in this case, the utterance of the autonomous mobile body 11 is prioritized, and the operation sound is not output.

On the other hand, in step S59, for example, in a case where lifting of the autonomous mobile body 11 is detected, the sound control unit 254 determines that the operation sound having the higher priority than the utterance of the autonomous mobile body 11 is the output target, and the processing proceeds to step S60.

Furthermore, in a case where it is determined in step S58 that the autonomous mobile body 11 is not uttering, the processing proceeds to step S60.

In step S60, the sound control unit 254 determines whether or not there is a plurality of operation sounds to be output. In a case where a plurality of motions of the autonomous mobile body 11 to be a target for outputting the operation sound is detected, the sound control unit 254 determines that there is a plurality of operation sounds to be output, and the processing proceeds to step S61.

In step S61, the sound control unit 254 selects an operation sound to be output. For example, the sound control unit 254 selects an operation sound with the highest priority among the operation sounds to be output.

Thereafter, the processing proceeds to step S62.

On the other hand, in step S60, in a case where only one motion of the autonomous mobile body 11 to be the target for outputting the operation sound is detected, the sound control unit 254 determines that there is one operation sound to be output. The processing in step S61 is skipped, and the processing proceeds to step S62.

In step S62, the autonomous mobile body 11 outputs an operation sound. Specifically, in a case where there is a plurality of operation sounds to be output, the sound control unit 254 generates output sound data for outputting the operation sound selected in the processing of step S60. On the other hand, in a case where there is only one operation sound to be output, the sound control unit 254 generates output sound data for outputting the operation sound. The sound control unit 254 supplies the generated output sound data to the sound output unit 205.

The sound output unit 205 outputs the operation sound on the basis of the acquired output sound data.

Thereafter, the processing returns to step S51, and the processing in and after step S51 is executed.

As described above, the operation sound with the high priority is preferentially output, and user experience is improved.

For example, after the autonomous mobile body 11 is lifted, the operation sound other than the lifting sound is not output. For example, in a case where the autonomous mobile body 11 moves in one of front, rear, left, and right directions, the rotation sound is not output. As a result, an operation sound that corresponds to a motion of the autonomous mobile body 11 recognized by the user and is natural and comfortable for the user is output.

Furthermore, in a case where the user talks or tries to talk, the operation sound other than the lifting sound and the utterance sound are not output. Therefore, it is possible to give the user an impression that the autonomous mobile body 11 listens to a user's utterance content without blocking the user's utterance.

On the other hand, even in a case where the user is talking, the lifting sound is output as it is without being changed. Therefore, for example, in a case where the user lifts the autonomous mobile body 11 while talking to it or talks to the autonomous mobile body 11 after lifting it, the autonomous mobile body 11 can express surprise caused by being lifted by the user by the lifting sound.

Note that, in the above description, an example has been described in which only the operation sound with the highest priority is output in a case where the plurality of motions has been detected. However, for example, output of another operation sound may be suppressed by lowering volume of the other operation sound with a low priority.

Furthermore, the operation sound with the highest priority may be changed on the basis of another motion other than the motion corresponding to the operation sound with the highest priority.

For example, an operation sound obtained by modulating the operation sound with the highest priority on the basis of magnitude, speed, and the like of another motion may be generated and output. For example, in a case where translation and lateral rotation of the autonomous mobile body 11 have been detected, frequency of a translation sound may be changed on the basis of magnitude, speed, and the like of the lateral rotation, or an overtone component of the translation sound may be increased to make a muddy sound.

Moreover, for example, an operation sound may be generated and output on the basis of an algorithm in which an algorithm for generating the operation sound with the highest priority is changed on the basis of magnitude, speed, and the like of another motion.

Furthermore, for example, the algorithm for generating the operation sound may be changed depending on a case where the autonomous mobile body 11 is lifted or not.

<Output Sound Changing Processing>

Next, processing in which the autonomous mobile body 11 changes an output sound according to a user's utterance or another autonomous mobile body will be described.

Note that a type of the other autonomous mobile body is not limited as long as the other autonomous mobile body is a mobile body that autonomously operates similarly to the autonomous mobile body 11 and can output an utterance sound in order to communicate with a user or another autonomous mobile body. For example, the other autonomous mobile body may be the same type of mobile body as the autonomous mobile body 11, or may be a different type of mobile body.

Figure 18:
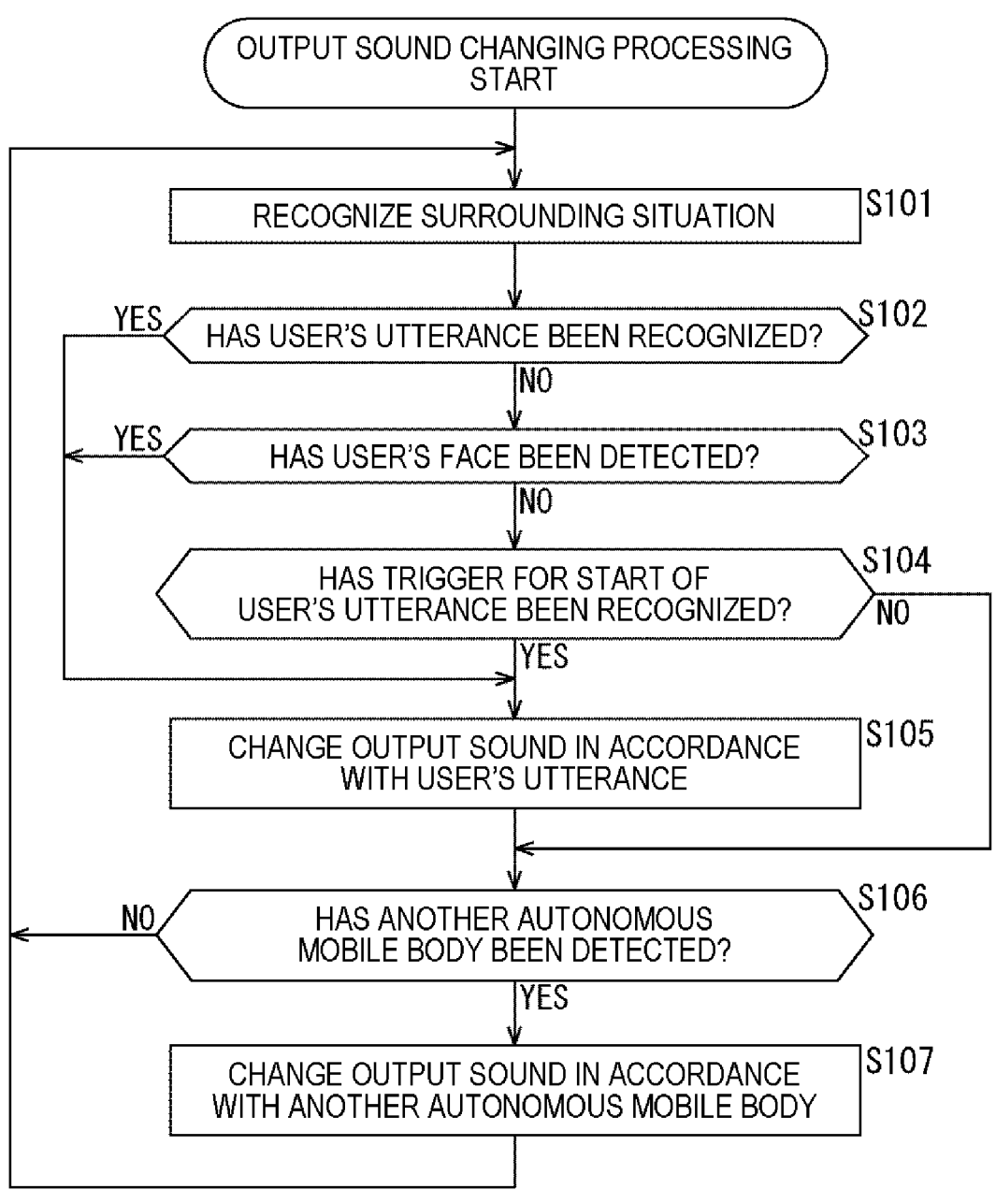
FIG. 18 is a flowchart for explaining output sound changing processing executed by the autonomous mobile body.

Here, the output sound changing processing executed by the autonomous mobile body 11 will be described with reference to a flowchart of FIG. 18.

For example, this processing is started when power of the autonomous mobile body 11 is turned on and is ended when the power is turned off.

Figure 17:
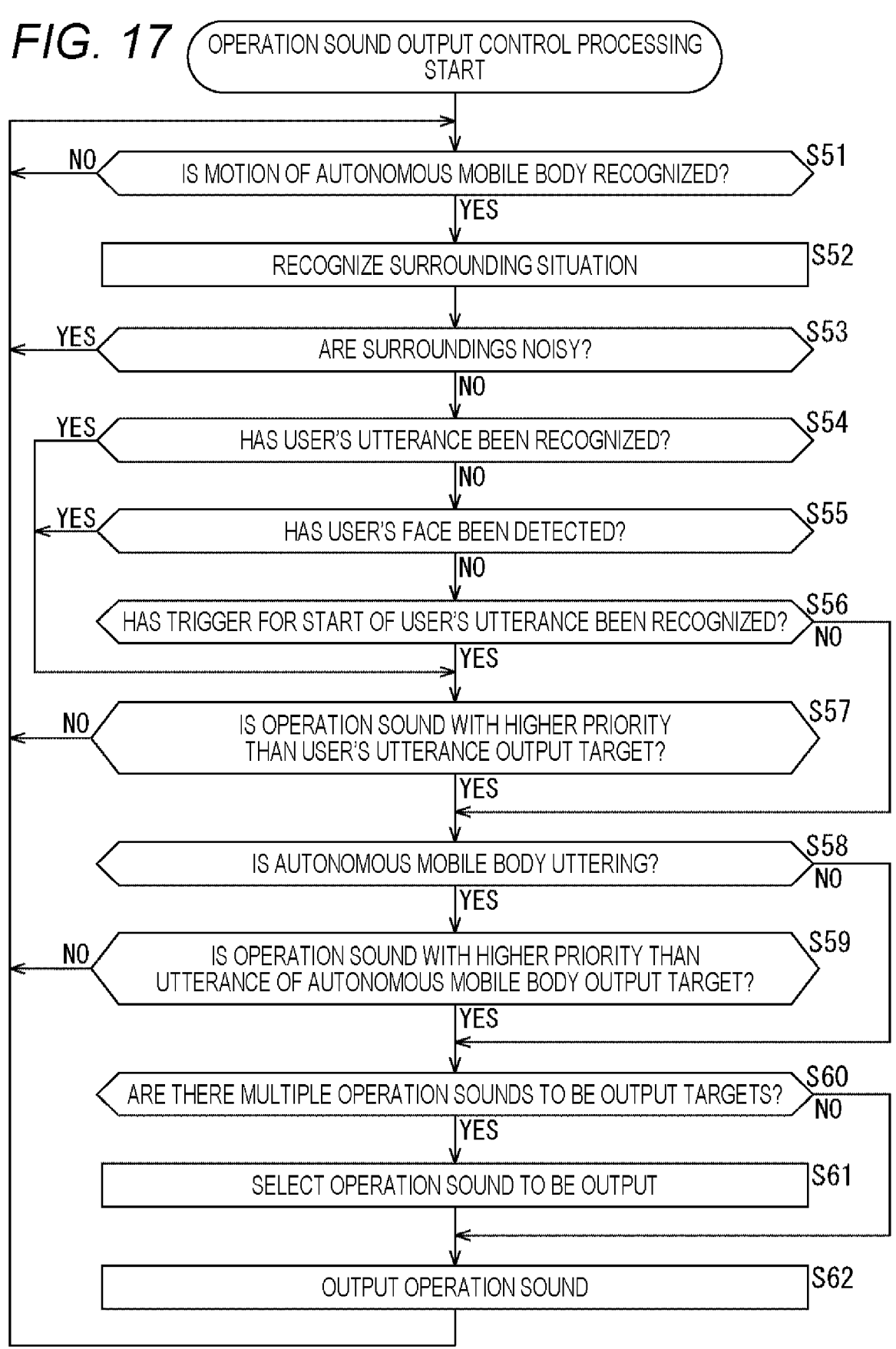
FIG. 17 is a flowchart for explaining a modified example of the operation sound output control processing executed by the autonomous mobile body.

In step S101, a surrounding situation is recognized, similarly to the processing in step S52 in FIG. 17.

In step S102, similarly to the processing in step S54 in FIG. 17, it is determined whether or not a user's utterance has been recognized. In a case where it is determined that the user's utterance has not been recognized, the processing proceeds to step S103.

In step S103, it is determined whether or not a user's face has been detected, similarly to the processing in step S55 in FIG. 17. In a case where it is determined that the user's face has not been detected, the processing proceeds to step S104.

In step S104, similarly to the processing in step S56 in FIG. 17, it is determined whether or not a trigger for a start of a user's utterance has been recognized. In a case where it is determined that the trigger for the start of the user's utterance has been recognized, the processing proceeds to step S105.

On the other hand, in a case where it is determined in step S103 that the user's face has been detected, the processing in step S104 is skipped, and the processing proceeds to step S105.

Furthermore, in a case where it is determined in step S102 that the user's utterance has been recognized, the processing in steps S103 and S104 is skipped, and the processing proceeds to step S105.

In step S105, the sound control unit 254 changes an output sound in accordance with the user's utterance.

For example, the sound control unit 254 changes volume, intensity, frequency, tone, sound quality, and the like of the output sound (operation sound or utterance sound) in order to prevent the user's utterance from being disturbed or give the user an impression that the autonomous mobile body 11 listens to the user's utterance.

For example, the sound control unit 254 reduces the volume of the output sound or stops the output sound.

For example, the sound control unit 254 reduces a component of a frequency band of human voice (for example, 200 Hz to 2 kHz) among frequency components of the output sound. Specifically, for example, the sound control unit 254 shifts a frequency band of the output sound to a band not including the frequency band of the human voice, or reduces a component included in the frequency band of the human voice among the frequency components of the output sound.

Thereafter, the processing proceeds to step S105.

On the other hand, in a case where it is determined in step S104 that the trigger for the start of the user's utterance has not been recognized, the processing in step S105 is skipped, and the processing proceeds to step S106.

In step S106, the sound control unit 254 determines whether or not another autonomous mobile body has been detected. In a case where it is determined that the other autonomous mobile body has been detected, the processing proceeds to step S107.

In step S107, the sound control unit 254 changes the output sound in accordance with the other autonomous mobile body.

For example, the sound control unit 254 changes the output sound (operation sound or utterance sound) output from the autonomous mobile body 11 so that an impression that the autonomous mobile body 11 is conscious of the other autonomous mobile body can be given to the user.

For example, the sound control unit 254 outputs the output sound so as to give an impression that the autonomous mobile body 11 talks (performs communication by sound) with the other autonomous mobile body. For example, when the other autonomous mobile body outputs an utterance sound, the sound control unit 254 suppresses the output sound. That is, the sound control unit 254 reduces volume of the utterance sound or the operation sound, or stops the utterance sound or the operation sound. On the other hand, for example, when the other autonomous mobile body does not output the utterance sound, the sound control unit 254 outputs the utterance sound or the operation sound without suppressing it. Therefore, for example, the autonomous mobile body 11 and the other autonomous mobile body alternately output the utterance sounds, and it is possible to give the user an impression that both of them are talking.

For example, the sound control unit 254 performs control to output the output sound in synchronization with the other autonomous mobile body. For example, the sound control unit 254 performs control so as to output an output sound having a rhythm or a tempo matched with an output sound of the other autonomous mobile body, or an output sound including a sound in harmony with an output sound of the other autonomous mobile body.

For example, the sound control unit 254 controls to output an utterance sound similar to an utterance sound of the other autonomous mobile body by bringing the utterance sound close to the utterance sound of the other autonomous mobile body. For example, the sound control unit 254 controls to output the utterance sound that mimics the utterance sound output by the other autonomous mobile body. Specifically, for example, in a case where the other autonomous mobile body is a dog-shaped robot, the sound control unit 254 performs control to output an utterance sound close to dog barking. Furthermore, for example, the sound control unit 254 brings an algorithm for outputting the utterance sound closer to an algorithm for outputting the utterance sound by the other mobile body. Moreover, for example, the sound control unit 254 recognizes pitch of the utterance sound of the other autonomous mobile body, and performs control so as to output an utterance sound that changes in a manner similar to the recognized pitch.

Note that information regarding the algorithm of the other autonomous mobile body is acquired, for example, by the communication unit 207 of the autonomous mobile body 11 directly communicating with the other autonomous mobile body. Alternatively, the communication unit 207 may acquire the information from the information processing server 12 and the like.

Thereafter, the processing returns to step S101, and the processing in and after step S101 is executed.

On the other hand, in a case where it is determined in step S106 that the other autonomous mobile body has not been detected, the processing returns to step S101, and the processing in and after step S101 is executed.

As described above, user experience is improved by changing the output sound according to the user's utterance and the other autonomous mobile body. For example, communication between the user and the autonomous mobile body 11 becomes smooth. Furthermore, for example, communication between the autonomous mobile body 11 and the other autonomous mobile body is realized, and the user can be entertained.

2. Modified Examples

Hereinafter, modified examples of the above-described embodiment of the present technology will be described.

The type and priority of the operation sound described above are examples, and can be changed. For example, it is possible to increase or decrease the type of the operation sound.

Furthermore, the output sound may be changed using conditions other than those described above.

For example, the sound control unit 254 of the autonomous mobile body 11 may change the output sound on the basis of presence/absence of or a distance to a surrounding person, or presence/absence of, a distance to, or a type of a surrounding object, and the like.

For example, the sound control unit 254 may change the output sound as a distance to a person decreases.

For example, the sound control unit 254 may change the output sound by different methods in a case where a distance to a person is decreased by movement of the person, in a case where it is increased by movement of the person, in a case where it is decreased by movement of the autonomous mobile body 11, and in a case where it is increased by movement of the autonomous mobile body 11.

For example, the sound control unit 254 may change the output sound in a case where an object or another autonomous mobile body is recognized in the surroundings.

For example, in a case where the sound control unit 254 recognizes a person who has not been recognized in the past (for example, a suspicious person), the output sound may be changed. For example, the sound control unit 254 may increase volume of a translation sound or a rotation sound. For example, the sound control unit 254 may increase an overtone component of the translation sound or the rotation sound or increase intensity of modulation of a synthesis sound constituting the translation sound or the rotation sound to make a sharp sound.

For example, the sound control unit 254 may change the output sound in a case of approaching an unmovable place such as a wall and the like.

For example, the sound control unit 254 may change the output sound when approaching a specific object. As the specific object, for example, an autonomous mobile body of the same type, an autonomous mobile body of a different type, a specific device, and the like are assumed. In this case, the sound control unit 254 may change the output sound by different methods depending on whether the approaching object is the autonomous mobile body of the same type, the autonomous mobile body of the different type, or the specific device.

Furthermore, as described above, the information processing server 12 can receive the sensor data from the autonomous mobile body 11 and control the operation and the output sound of the autonomous mobile body 11 on the basis of the received sensor data.

Moreover, in a case where the information processing server 12 controls the output sound of the autonomous mobile body 11, the information processing server 12 may generate the output sound, or the autonomous mobile body 11 may generate the output sound under the control of the information processing server 12.

3. Others

Configuration Example of Computer

The series of processing described above can be executed by hardware or software. In a case where the series of processing is executed by the software, a program constituting the software is installed on a computer. Here, the computer includes a computer incorporated in dedicated hardware, a general-purpose personal computer capable of executing various functions by installing various programs, and the like, for example.

Figure 19:
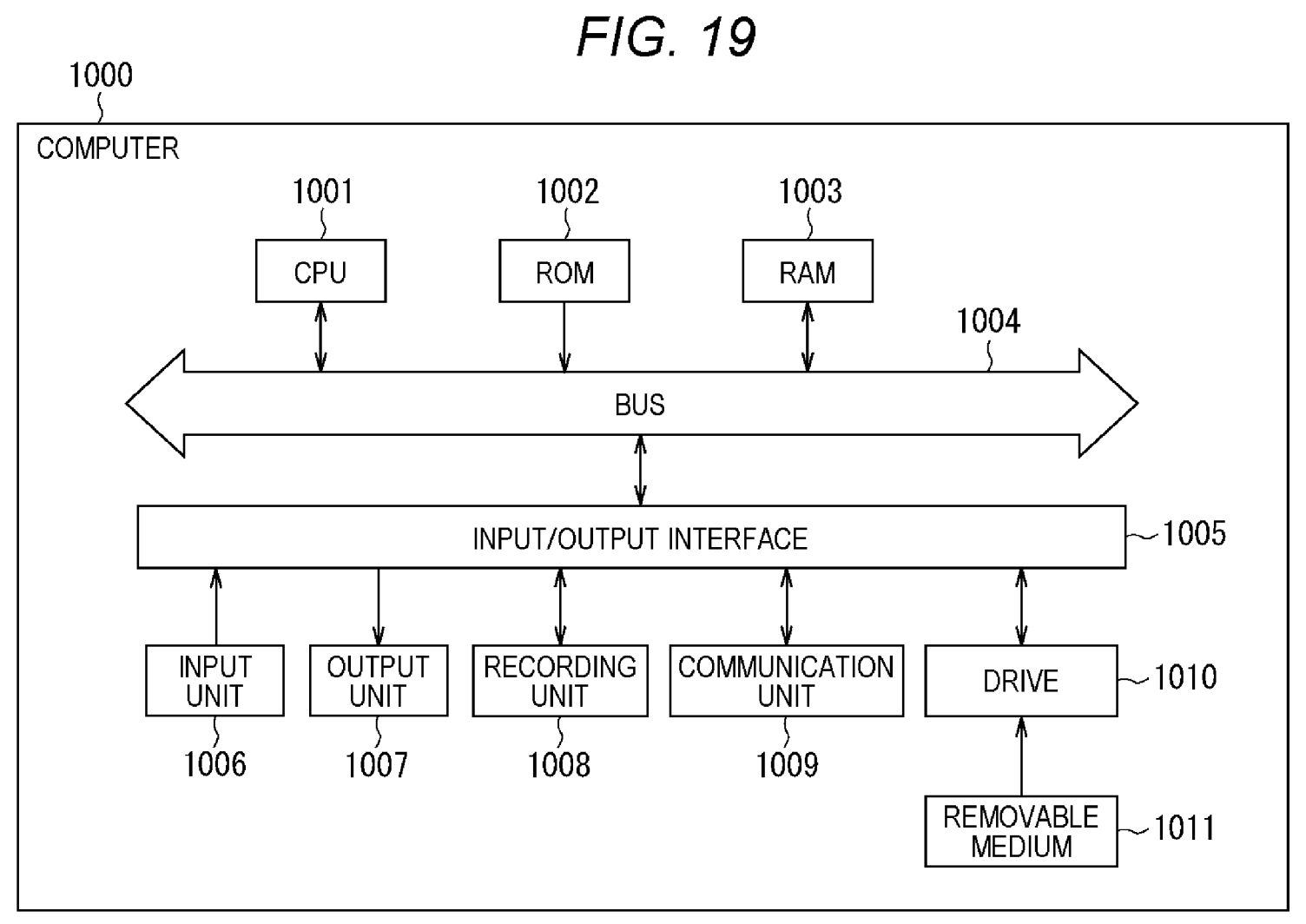

FIG. 19 is a block diagram illustrating a configuration example of hardware of a computer that executes the above-described series of processing by a program.

In a computer 1000, a central processing unit (CPU) 1001, a read only memory (ROM) 1002, and a random access memory (RAM) 1003 are mutually connected by a bus 1004.

Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The recording unit 1008 includes a hard disk, a nonvolatile memory, and the like. The communication unit 1009 includes a network interface and the like. The drive 1010 drives a removable medium 1011 such as a magnetic disk, an optical disk, a magneto-optical disk, or a semiconductor memory.

In the computer 1000 configured as described above, for example, the CPU 1001 loads a program stored in the recording unit 1008 into the RAM 1003 via the input/output interface 1005 and the bus 1004 and executes the program, whereby the above-described series of processing is performed.

The program executed by the computer 1000 (CPU 1001) can be provided by recording on the removable medium 1011 as a package medium and the like, for example. Furthermore, the program can be provided via a wired or wireless transmission medium such as a local area network, the Internet, or digital satellite broadcasting.

In the computer 1000, the program can be installed in the recording unit 1008 via the input/output interface 1005 by attaching the removable medium 1011 to the drive 1010. Furthermore, the program can be received by the communication unit 1009 via a wired or wireless transmission medium and installed in the recording unit 1008. In addition, the program can be installed in the ROM 1002 or the recording unit 1008 in advance.

Note that the program executed by the computer may be a program in which processing is performed in time series in the order described in the present specification, or may be a program in which processing is performed in parallel or at necessary timing such as when a call is made, and the like.

Furthermore, in the present specification, the system means a set of a plurality of components (devices, modules (parts), and the like), and it does not matter whether or not all the components are in the same housing. Therefore, a plurality of devices housed in separate housings and connected via a network, and one device housing a plurality of modules in one housing are both systems.

Moreover, an embodiment of the present technology is not limited to the above-described embodiment, and various modifications can be made without departing from the scope of the present technology.

For example, the present technology can be configured as cloud computing in which one function is shared and jointly processed by a plurality of devices via a network.

Furthermore, each step described in the above-described flowcharts can be executed by one device or shared and executed by a plurality of devices.

Moreover, in a case where one step includes a plurality of processing, the plurality of processing included in the one step can be executed by one device or shared and executed by a plurality of devices.

Combination Example of Configurations

Note that the present technology can have the following configurations.

21

(1)

An autonomous mobile body including:

a recognition unit that recognizes a motion of its own device; and a sound control unit that controls an output sound output from the own device, in which the sound control unit controls output of a plurality of operation sounds that is the output sound corresponding to a plurality of the motions of the own device, and changes the operation sound in a case where the plurality of motions has been recognized.

(2)

The autonomous mobile body according to (1), in which in a case where the plurality of motions has been recognized, the sound control unit performs control to preferentially output the operation sound having a high priority.

(3)

The autonomous mobile body according to (2), in which in a case where the plurality of motions has been recognized, the sound control unit suppresses the operation sound other than the operation sound having the highest priority.

(4)

The autonomous mobile body according to (2) or (3), in which in a case where the plurality of motions has been recognized, the sound control unit changes the operation sound having the highest priority on the basis of a motion corresponding to the other operation sound having a low priority.

(5)

The autonomous mobile body according to any one of (1) to (4), in which the recognition unit performs recognition of a surrounding person, and the sound control unit controls the output sound on the basis of a recognition result of the surrounding person.

(6)

The autonomous mobile body according to (5), in which the sound control unit controls the output sound on the basis of a distance to the person.

(7)

The autonomous mobile body according to (5) or (6), in which the sound control unit controls the output sound so as to give priority to an utterance of the person.

(8)

The autonomous mobile body according to (7), in which the sound control unit suppresses the output sound during the utterance of the person.

(9)

The autonomous mobile body according to (7) or (8), in which the sound control unit changes the output sound so as to reduce a frequency component of human voice.

(10)

The autonomous mobile body according to any one of (7) to (9), in which the sound control unit performs control so as to output the operation sound having a higher priority than the utterance of the person without changing the operation sound.

(11)

The autonomous mobile body according to any one of (1) to (10), in which the recognition unit performs recognition of a surrounding object, and

the sound control unit controls the output sound on the basis of a recognition result of the surrounding object.

(12)

The autonomous mobile body according to (11), in which the sound control unit controls the output sound on the basis of a type of the surrounding object.

(13)

The autonomous mobile body according to (11) or (12), in which the sound control unit controls the output sound on the basis of a distance to the surrounding object.

(14)

The autonomous mobile body according to any one of (1) to (12), in which the recognition unit recognizes another autonomous mobile body, and the sound control unit controls the output sound on the basis of a recognition result of the other autonomous mobile body.

(15)

The autonomous mobile body according to (14), in which the sound control unit suppresses the output sound in a case where the other autonomous mobile body outputs an utterance sound.

(16)

The autonomous mobile body according to (14) or (15), in which the sound control unit performs control to output the output sound synchronized with an output sound of the other autonomous mobile body or the output sound similar to the output sound of the other autonomous mobile body.

(17)

The autonomous mobile body according to any one of (14) to (16), in which the sound control unit changes the output sound in accordance with approach to the other autonomous mobile body.

(18)

An information processing method including:

recognizing a motion of an autonomous mobile body; and controlling output of a plurality of operation sounds that is an output sound corresponding to a plurality of the motions of the autonomous mobile body, and changing the operation sound in a case where the plurality of motions has been recognized.

(19)

A program that causes a computer to execute processing of:

recognizing a motion of an autonomous mobile body; and controlling output of a plurality of operation sounds that is an output sound corresponding to a plurality of the motions of the autonomous mobile body, and changing the operation sound in a case where the plurality of motions has been recognized.

(20)

An information processing apparatus including:

a recognition unit that recognizes a motion of an autonomous mobile body; and a sound control unit that controls an output sound output from the autonomous mobile body, in which the sound control unit controls output of a plurality of operation sounds that is the output sound corresponding to a plurality of the motions of the autonomous mobile body, and changes the operation sound in a case where the plurality of motions has been recognized.

Note that the effects described in the present specification are merely examples and are not limited, and there may be other effects.

REFERENCE SIGNS LIST

1 Information processing system
11 Autonomous mobile body
12 Information processing server
201 Control unit
202 Sensor unit
205 Sound output unit
241 Information processing unit
251 Recognition unit
252 Action planning unit
253 Operation control unit
254 Sound control unit
302 Recognition unit
303 Action planning unit
304 Operation control unit
305 Sound control unit

The invention claimed is:

1. A first autonomous mobile body, comprising:
a central processing unit (CPU) configured to:
    concurrently recognize a plurality of motions of the first autonomous mobile body, wherein
        each motion of the plurality of motions is associated with a corresponding operation sound of a plurality of operation sounds,
        the plurality of operation sounds acoustically expresses physical motions of the first autonomous mobile body,
        the physical motions correspond to the plurality of motions, and
        each operation sound of the plurality of operation sounds has a respective priority;
    determine a first operation sound of the plurality of operation sounds, wherein
        the first operation sound has a highest priority among the plurality of operation sounds, and
        the first operation sound is associated with a first motion of the plurality of motions;
    change a parameter of the first operation sound to reflect a second motion of the plurality of motions, wherein
        the second motion is associated with a second operation sound of the plurality of operation sounds, and
        the second operation sound has a lower priority than the first operation sound; and
    control an output of a first output sound, wherein the first output sound includes the first operation sound that has the changed parameter.

2. The first autonomous mobile body according to claim 1, wherein the CPU is further configured to suppress operation sounds of the plurality of operation sounds other than the first operation sound.

3. The first autonomous mobile body according to claim 1, wherein the CPU is further configured to:
    recognize a person that surrounds the first autonomous mobile body; and
    control, based on the recognition of the person, the output of the first output sound.

4. The first autonomous mobile body according to claim 3, wherein the CPU is further configured to control, based on a distance between the person and the first autonomous mobile body, the output of the first output sound.

5. The first autonomous mobile body according to claim 3, wherein
    the CPU is further configured to control the output of the first output sound based on an utterance of the person, the utterance of the person has a priority higher than a priority of each operation sound of a set of operation sounds, and lower than a priority of at least one specific operation sound, of the plurality of operation sounds, other than the set of operation sounds, and
    the plurality of operation sounds includes the set of operation sounds.

6. The first autonomous mobile body according to claim 5, wherein
    the CPU is further configured to control the output of the first output sound having a priority higher than the priority of the utterance of the person, and
    the at least one specific operation sound includes the first output sound.

7. The first autonomous mobile body according to claim 5, wherein the CPU is further configured to suppress the plurality of operation sounds based on the utterance of the person.

8. The first autonomous mobile body according to claim 5, wherein the CPU is further configured to control the output of the first output sound to reduce a frequency component of a human voice.

9. The first autonomous mobile body according to claim 1, wherein the CPU is further configured to:
    recognize an object that surrounds the first autonomous mobile body; and
    control, based on the recognized object, the output of the first output sound.

10. The first autonomous mobile body according to claim 9, wherein the CPU is further configured to control, based on a type of the object, the output of the first output sound.

11. The first autonomous mobile body according to claim 9, wherein the CPU is further configured to control, based on a distance between the first autonomous mobile body and the object, the output of the first output sound.

12. The first autonomous mobile body according to claim 9, wherein the object includes a second autonomous mobile body different from the first autonomous mobile body.

13. The first autonomous mobile body according to claim 12, wherein the CPU is further configured to suppress, based on an utterance sound output by the second autonomous mobile body, the output of the first output sound of the first autonomous mobile body.

14. The first autonomous mobile body according to claim 12, wherein
    the CPU is further configured to control the output of a second output sound of the first autonomous mobile body, and
    the second output sound is one of synchronized with a third output sound of the second autonomous mobile body or similar to the third output sound of the second autonomous mobile body.

15. The first autonomous mobile body according to claim 12, wherein the CPU is further configured to change the first output sound based on approach of the second autonomous mobile body towards the first autonomous mobile body.

16. A non-transitory computer readable medium having stored thereon computer-executable instructions, which when executed by a computer, cause the computer to execute operations, the operations comprising:
    concurrently recognizing a plurality of motions of an autonomous mobile body, wherein
        each motion of the plurality of motions is associated with a corresponding operation sound of a plurality of operation sounds,
        the plurality of operation sounds acoustically expresses physical motions of the autonomous mobile body, the physical motions correspond to the plurality of motions, and each operation sound of the plurality of operation sounds has a respective priority;

determining a first operation sound of the plurality of operation sounds, wherein the first operation sound has a highest priority among the plurality of operation sounds, and the first operation sound is associated with a first motion of the plurality of motions;

changing a parameter of the first operation sound to reflect a second motion of the plurality of motions, wherein the second motion is associated with a second operation sound of the plurality of operation sounds, and the second operation sound has a lower priority than the first operation sound; and controlling an output of an output sound, wherein the output sound includes the first operation sound having the changed parameter.

17. An information processing apparatus, comprising:

a central processing unit (CPU) configured to:

concurrently recognize a plurality of motions of an autonomous mobile body, wherein each motion of the plurality of motions is associated with a corresponding operation sound of a plurality of operation sounds, the plurality of operation sounds acoustically expresses physical motions of the autonomous mobile body, the physical motions correspond to the plurality of motions, and each operation sound of the plurality of operation sounds has a respective priority;

determine a first operation sound of the plurality of operation sounds, wherein the first operation sound has a highest priority among the plurality of operation sounds, and the first operation sound is associated with a first motion of the plurality of motions;

change a parameter of the first operation sound to reflect a second motion of the plurality of motions, wherein the second motion is associated with a second operation sound of the plurality of operation sounds, and the second operation sound has a lower priority than the first operation sound; and control an output of an output sound, wherein the output sound includes the first operation sound that has the changed parameter.

18. An information processing method, comprising:

concurrently recognizing a plurality of motions of an autonomous mobile body, wherein each motion of the plurality of motions is associated with a corresponding operation sound of a plurality of operation sounds, the plurality of operation sounds acoustically expresses physical motions of the autonomous mobile body, the physical motions correspond to the plurality of motions, and each operation sound of the plurality of operation sounds has a respective priority;

determining a first operation sound of the plurality of operation sounds, wherein the first operation sound has a highest priority among the plurality of operation sounds, and the first operation sound is associated with a first motion of the plurality of motions;

changing a parameter of the first operation sound to reflect a second motion of the plurality of motions, wherein the second motion is associated with a second operation sound of the plurality of operation sounds, and the second operation sound has a lower priority than the first operation sound; and controlling an output of an output sound, wherein the output sound includes the first operation sound having the changed parameter.

* * * * *